US012507260B2

United States Patent
Kang et al.

(10) Patent No.: US 12,507,260 B2
(45) Date of Patent: Dec. 23, 2025

(54) METHOD AND APPARATUS FOR SUPPORTING PATH SWITCH OPERATION OF REMOTE UE ON SIDELINK IN WIRELESS COMMUNICATION SYSTEM

(71) Applicant: Samsung Electronics Co., Ltd., Suwon-si (KR)

(72) Inventors: Hyunjeong Kang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 18/068,362

(22) Filed: Dec. 19, 2022

(65) Prior Publication Data

US 2023/0199803 A1    Jun. 22, 2023

(30) Foreign Application Priority Data

Dec. 20, 2021    (KR) ........................ 10-2021-0182323

(51) Int. Cl.
*H04W 72/25*    (2023.01)
*H04W 8/00*    (2009.01)
*H04W 88/04*    (2009.01)

(52) U.S. Cl.
CPC .......... *H04W 72/25* (2023.01); *H04W 8/005* (2013.01); *H04W 88/04* (2013.01)

(58) Field of Classification Search
None
See application file for complete search history.

(56) References Cited

U.S. PATENT DOCUMENTS

| 2018/0302779 | A1 | 10/2018 | Fujishiro |
| 2019/0058986 | A1 | 2/2019 | Loehr et al. |
| 2019/0387429 | A1* | 12/2019 | Basu Mallick ... H04W 28/0289 |
| 2022/0078685 | A1* | 3/2022 | Ly .......................... H04W 36/06 |
| 2024/0056166 | A1* | 2/2024 | Chang ................... H04W 40/22 |
| 2024/0179611 | A1* | 5/2024 | Chen ..................... H04W 76/19 |
| 2024/0244649 | A1* | 7/2024 | Zhang ................... H04W 72/25 |

FOREIGN PATENT DOCUMENTS

KR    10-2022-0105579 A    7/2022

OTHER PUBLICATIONS

International Search Report and Written Opinion of the International Searching Authority dated Mar. 21, 2023, in connection with International Application No. PCT/KR2022/020768, 8 pages.
CATT, "Leftover Issues for Sidelink Discovery," R2-2109512, 3GPP RAN WG2 Meeting #116-e, Electronic, Nov. 1-12, 2021, 8 pages.
Intel Corporation, "On Sidelink Discovery for Relaying," R2-2006931, 3GPP RAN WG2 Meeting #111-e, Electronic meeting, Aug. 17-28, 2020, 10 pages.

(Continued)

*Primary Examiner* — Nicholas Sloms

(57) ABSTRACT

The disclosure relates to a 5G or 6G communication system for supporting a higher data transmission rate. According to various embodiments of the disclosure, it is possible to provide a terminal method and apparatus for obtaining a link quality measurement configuration and measuring the link quality for a sidelink relay to support connection with a sidelink relay terminal and mobility of the terminal in a wireless communication system.

16 Claims, 14 Drawing Sheets

(56) References Cited

OTHER PUBLICATIONS

Mediatek Inc., "Introduction of Rel-17 Sidelink Relay," R2-2111437, 3GPP RAN WG2 Meeting #116-e Electronic Online Meeting, Nov. 1-12, 2021, 39 pages.
Oppo (Rapporteur), "Summary of [Post111-e][623][Relay] Remaining issues on relay discovery," R2-2010661 revision of R2-2008815, 3GPP RAN WG2 Meeting #111-e, E-meeting, Nov. 2020, 39 pages.
Supplementary European Search Report dated Dec. 23, 2024, in connection with European Patent Application No. 22911831.0, 12 pages.
Xiaomi Communications, "Miscellaneous corrections on 38.331," R2-2101596, 3GPP TSG-RAN WG2 Meeting #113-e, eMeeting, Jan. 25-Feb. 5, 2021, 8 pages.
ZTE et al., "Consideration on the control plane procedure of SL relay," R2-2104978, 3GPP TSG-RAN WG2 Meeting #114 electronic, Online, May 19-27, 2021, 12 pages.
Ericsson, "Discussion on SL information reporting over Uu," R2-1913324, 3GPP TSG-RAN W62 #107bis R2-1913324, Chongqing, China, Oct. 14-18, 2019, 5 pages.

\* cited by examiner

METHOD AND APPARATUS FOR SUPPORTING PATH SWITCH OPERATION OF REMOTE UE ON SIDELINK IN WIRELESS COMMUNICATION SYSTEM

CROSS-REFERENCE TO RELATED APPLICATION

This application is based on and claims priority under 35 U.S.C. § 119 of a Korean Patent Application Number 10-2021-0182323, filed on Dec. 20, 2021, in the Korean Intellectual Property Office, the disclosure of each of which is incorporated by reference herein in its entirety.

BACKGROUND

Field

The disclosure relates to a wireless communication system. More particularly, the disclosure relates to a method and apparatus for handling mobility of a terminal capable of being connected to the network through a relay terminal based on a sidelink in a wireless communication system.

Description of Related Art 5G mobile communication technologies define broad frequency bands such that high transmission rates and new services are possible, and can be implemented not only in "Sub 6 GHz" bands such as 3.5 GHZ, but also in "Above 6 GHz" bands referred to as mm Wave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

In addition, terminal-to-terminal communication (sidelink communication) using a 5G communication system is being studied, and the sidelink communication is applied to, for example, vehicle-to-everything (V2X) and public safety networks and is expected to provide various services to users.

In particular, there is a demand for a method of utilizing a sidelink relay that can extend service coverage, increase data transmission reliability, and reduce power consumption of a terminal.

SUMMARY

An object of an embodiment of the disclosure is to provide a method and apparatus for measuring, when a terminal is connected to a network through a sidelink relay or is directly connected to the network, the link quality between the terminal and the sidelink relay terminal in order to support mobility of the terminal in a wireless communication system.

Further, an object of an embodiment of the disclosure is to provide a method and apparatus for reporting, to the base station, information on a sidelink discovery message to be transmitted by a terminal or information on data transmission and reception through a sidelink relay in a wireless communication system.

The technical objectives to be achieved in the disclosure are not limited to those mentioned above, and other technical objectives not mentioned will be clearly understood to those skilled in the art to which the disclosure belongs from the following description.

In accordance with an aspect of the disclosure, a method performed by a terminal in a wireless communication system is provided. The method comprises: identifying whether at least one of the terminal is interested to receive or transmit a sidelink discovery message or requesting of transmission resource for the sidelink discovery message, or the terminal is requesting of transmission resource for a user equipment to network (U2N) relay communication; and transmitting, to a base station, a message including sidelink UE information, wherein in case that the terminal is interested to receive or transmit the sidelink discovery message or requesting of the transmission resource for the sidelink discovery message, the sidelink UE information comprises information associated with a transmission of the sidelink discovery message, and wherein incase that the terminal is requesting of the transmission resource for the U2N relay communication, the sidelink UE information comprises information associated with the U2N relay communication.

In an embodiment, the method further comprises: receiving, from the base station, system information comprising information whether the base station supports at least one of sidelink relay discovery or sidelink relay communication.

In an embodiment, the information associated with the transmission of the sidelink discovery message comprises information on at least one frequency for receiving the sidelink discovery message, in case that the terminal is configured to receive the sidelink discovery message.

In an embodiment, the information associated with the transmission of the sidelink discovery message comprises information for requesting to the base station to assign at least one resource for transmitting the sidelink discovery message, in case that the terminal is configured to transmit the sidelink discovery message.

In an embodiment, the information or requesting to the base station comprises at least one of information on at least one destination identity indicating at least one destination for transmitting the sidelink discovery message, information on at least one cast type of the at least one destination for transmitting the sidelink discovery message, information on at least one frequency of the at least one destination on which the terminal is interested to transmit the sidelink discovery message, or information on at least one synchronization reference used on the at least one frequency for transmitting the sidelink discovery message.

In an embodiment, the information associated with the U2N relay communication comprises information for requesting to the base station to assign at least one resource for the U2N relay communication, in case that the terminal is configured to transmit the U2N relay communication.

In an embodiment, the information or requesting to the base station comprises at least one of information on at least one destination identity indicating at least one destination for the U2N relay communication, information on at least one frequency of the at least one destination on which the terminal is interested in a transmission for the U2N relay communication, or information on at least one synchronization reference used on the at least one frequency for the U2N relay communication.

In an embodiment, the message comprises a sidelink UE information NR (new radio) message.

In an embodiment, the system information comprises a system information block (SIB) 12.

In accordance with an aspect of the disclosure, a terminal in a wireless communication system is provided. The terminal comprises: a transceiver; and a controller coupled with the transceiver and configured to: identify whether at least one of the terminal is interested to receive or transmit a sidelink discovery message or requesting of transmission resource for the sidelink discovery message, or the terminal is requesting of transmission resource for a user equipment to network (U2N) relay communication, and transmit, to a base station, a message including sidelink UE information, wherein in case that the terminal is interested to receive or transmit the sidelink discovery message or requesting of the transmission resource for the sidelink discovery message, the sidelink UE information comprises information associated with a transmission of the sidelink discovery message, and wherein in case that the terminal is requesting of the transmission resource for the U2N relay communication, the sidelink UE information comprises information associated with the U2N relay communication.

According to an embodiment of the disclosure, in a method for supporting mobility of a terminal in a wireless communication system in case that the terminal is connected to a network through a connection with a sidelink relay or the terminal is directly connected to the network, the method may include: obtaining measurement configuration information for measuring link quality as to the sidelink relay when the terminal is connected to the sidelink relay; determining whether to perform measurement on a discovery message of the sidelink relay or on a message transmitted and received through a unicast connection with the sidelink relay; performing measurement on a discovery message of the sidelink relay; and performing measurement on a message transmitted and received through the unicast connection with the sidelink relay.

According to an embodiment of the disclosure, in a method for reporting information about a sidelink discovery message to be transmitted by a terminal in a wireless communication system or information about data transmission and reception through a sidelink relay to a base station, the method may include: obtaining, by the terminal, information on a sidelink discovery message and composing a message to be reported to the base station; obtaining, by the terminal, information on data transmission and reception through the sidelink relay and composing a message to be reported to the base station; and transmitting, by the terminal, the composed report message to the base station.

According to an embodiment of the disclosure, it is possible to provide an apparatus and method that can effectively provide services and extend service coverage in a wireless communication system.

The effects obtainable in the disclosure are not limited to those mentioned above, and other effects not mentioned will be clearly understood by those skilled in the art to which the disclosure belongs from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
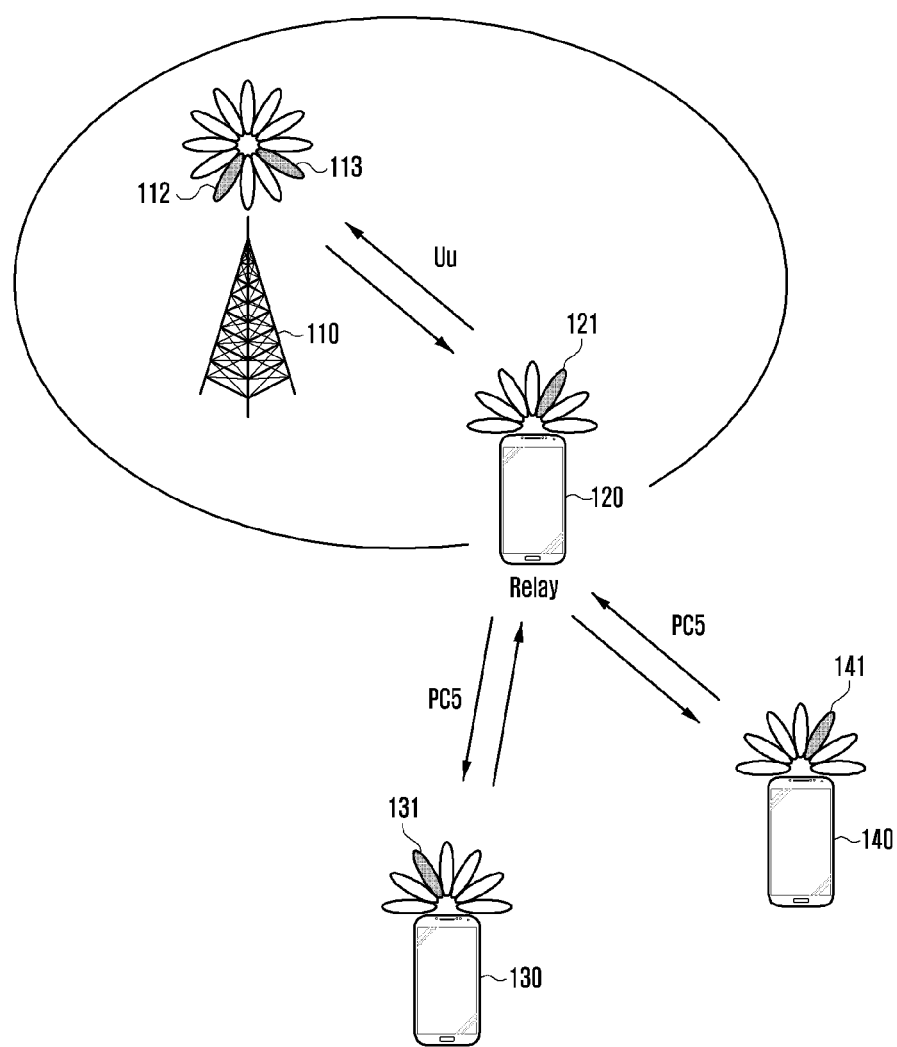
FIG. 1A illustrates a wireless communication system according to an embodiment of the present disclosure.

FIGS. 1A through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, exemplary embodiments of the disclosure will be described in detail with reference to the accompanying drawings. Here, it should be noted that the same components are denoted by the same reference symbols as much as possible in the accompanying drawings. In addition, detailed descriptions of well-known functions and configurations that may obscure the gist of the disclosure will be omitted.

In the following description of embodiments of the present specification, descriptions of technical details well known in the art and not directly related to the disclosure may be omitted. This is to more clearly convey the subject matter of the disclosure without obscurities by omitting unnecessary descriptions.

Likewise, in the drawings, some elements are exaggerated, omitted, or only outlined in brief. Also, the size of each element does not necessarily reflect the actual size. The same or similar reference symbols are used throughout the drawings to refer to the same or like parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the description to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Further, each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit," "module," or the like used in the embodiments may refer to a software component or a hardware component such as an FPGA or ASIC capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Further, components and units may be implemented to drive one or more processors or CPUs in a device or a secure multimedia card.

In describing the embodiments of the disclosure in detail, the main focus is placed on the radio access network (new RAN (NR)) and the packet core (5G system, 5G core network, or next generation core (NG core)) being the core network according to the 5G mobile communication standards specified by 3rd generation partnership project (3GPP) being a mobile communication standardization organization, but it should be understood by those skilled in the art that the subject matter of the disclosure is applicable to other communication systems having similar technical backgrounds without significant modifications departing from the scope of the disclosure.

In the 5G system, to support network automation, a network data collection and analysis function (NWDAF), which is a network function that provides a function to analyze and provide data collected from a 5G network, can be defined. The NWDAF can collect/store/analyze information from the 5G network and provide results to unspecified network functions (NFs), and the analysis results can be used independently by each NF.

For convenience of description, some terms and names defined in the 3GPP standards (standards of 5G, NR, LTE, or similar systems) may be used. However, the disclosure is not limited by these terms and names, and may be equally applied to systems conforming to other standards.

On the other hand, the disclosure relates to a method and apparatus for supporting, when a UE is connected to the network through a sidelink relay or is directly connected to the network, sidelink signal strength measurement between the sidelink relay and the UE in order to support mobility of the UE in a wireless communication system. In addition, the disclosure relates to a method and apparatus, in a wireless communication system supporting data transmission and reception through a sidelink relay, which enable a UE to obtain information on a sidelink discovery message and report the information to the base station or enable a UE to obtain information on data transmission and reception through the sidelink relay and report the information to the base station. The disclosure provides a method and apparatus that obtain configuration information for measuring sidelink signal strength between a UE and a sidelink relay UE in a wireless communication system. The disclosure provides a method and apparatus in a wireless communication system for a UE to provide information on a sidelink discovery message to be transmitted to the base station or provide information on data transmission and reception through a sidelink relay to the base station.

More specifically, the disclosure provides a scheme by which the UE obtains configuration information for sidelink signal strength measurement on a unicast connection with the sidelink relay from the base station or sidelink relay or obtains configuration information for measuring the sidelink signal strength of a sidelink discovery message transmitted by the sidelink relay, and, based on the obtained configuration information, measures the sidelink signal strength for a unicast connection with the sidelink relay or measures the sidelink signal strength of a sidelink discovery message transmitted by the sidelink relay. In addition, the disclosure provides a scheme by which the UE configures and transmits, when the UE transmits a sidelink discovery message, a message for reporting information on the sidelink discovery message to the base station, and provides a scheme by which the UE configures and transmits, when the UE performs data transmission and reception through the sidelink relay, a message for reporting information on data transmission and reception through the sidelink relay to the base station. According to embodiments of the disclosure, the UE can extend service coverage through a sidelink relay UE, increase the reliability of data transmission and reception, and minimize battery usage in the UE.

Those terms used in the following description for indicating a signal, indicating a channel, indicating control information, indicating a network entity, and indicating a component of an equipment are taken as illustration for ease of description. Accordingly, the disclosure is not limited by the terms used herein, and other terms referring to objects having an equivalent technical meaning may be used.

In the following description, a base station (BS) is a main agent that allocates resources to a UE, and may be at least one of gNode B (gNB), eNode B (eNB), node B, radio access unit, base station controller, or node on a network. A terminal may include user equipment (UE), mobile station (MS), cellular phone, smartphone, computer, or multimedia system capable of performing communication functions. However, these are only illustrative, and the base station and the terminal are not limited thereto. In the disclosure, eNB may be used interchangeably with gNB for convenience of description. That is, a base station described as an eNB may indicate a gNB. In the disclosure, the term "terminal" may indicate various wireless communication devices as well as mobile phones, NB-IoT devices, and sensors.

In the following description, a physical channel or a signal may be used interchangeably with data or a control signal. For example, a physical downlink shared channel (PDSCH) is a term referring to a physical channel through which data is transmitted, but the PDSCH may also be used to refer to data. That is, in the disclosure, an expression "transmitting a physical channel" may be interpreted as being equivalent to an expression "transmitting data or a signal through a physical channel."

In the disclosure, higher signaling indicates a method of transmitting a signal from the base station to the UE by using a downlink data channel of the physical layer, or from the UE to the base station by using an uplink data channel of the physical layer. Higher signaling may be understood as radio resource control (RRC) signaling or medium access control (MAC) control element (CE).

Also, in the disclosure, to determine whether a specific condition is satisfied or fulfilled, an expression such as "greater than" or "less than" may be used, but this is illustrative and does not exclude the use of "greater than or equal to" or "less than or equal to," "greater than or equal to," "less than or equal to," and "greater than or equal to and less than" may be replaced with "greater than," "less than," and "greater than and greater than or equal to," respectively.

In addition, although the disclosure describes embodiments using terms used in some communication standards (e.g., 3rd generation partnership project (3GPP)), this is only an example for description. The embodiments of the disclosure may be applied to other communication systems with easy modifications.

FIG. 1A illustrates a wireless communication system according to an embodiment of the present disclosure.

FIG. 1A illustrates a base station 110, UEs 130 and 140, and a sidelink relay 120 capable of relaying data transmission and reception between the base station 110 and the UEs 130 and 140 as some of nodes using radio channels in a wireless communication system. Here, the sidelink relay corresponds to a UE-to-network (U2N) relay. Although only one base station is illustrated in FIG. 1A, other base stations that are the same as or similar to the base station 110 may be further included.

The base station 110 is a network infrastructure that provides radio access to the UEs 130 and 140 and the relay 120. The base station 110 has a coverage defined as a specific geographic area based on the signal transmission distance. The base station 110 may also be referred to as "access point (AP)," "eNodeB (eNB)," "5th generation node (5G node)," "next generation nodeB (gNB)," "wireless point," "transmission/reception point (TRP)," or another term having an equivalent technical meaning.

The relay 120 is an equipment used by a user or network infrastructure and can communicate with the base station 110 through a radio channel. The link from the base station 110 to the relay 120 may be referred to as downlink (DL), and the link from the relay 120 to the base station 110 may be referred to as uplink (UL). The base station 110 and the relay 120 may be connected through a Uu interface. Uplink (UL) refers to a radio link through which the relay 120 transmits data or control signals to the base station 110, and downlink (DL) refers to a radio link through which the base station 110 transmits data or control signals to the relay 120.

The relay 120 may perform communication with the UEs 130 and 140 through a radio channel. Here, the link between the relay 120 and the UE 130 and the link between the relay 120 and the UE 140 are referred to as a sidelink, and the sidelink may be referred to as a PC5 interface.

Each of the UEs 130 and 140 is an equipment used by a user, and can communicate with the base station 110 through a radio channel or communicate with the network through a radio channel via the relay 120. In the disclosure, only a case in which each of the UEs 130 and 140 performs communication with the relay 120 through a radio channel is shown. At least one of the UE 130 or the UE 140 may be operated without user's involvement. That is, at least one of the UE 130 or the UE 140 may be a device that performs machine type communication (MTC), and may be not carried by a user. Each of the UE 130 and the UE 140 may be referred to as "terminal," "user equipment (UE)," "subscriber station," "remote terminal," "wireless terminal," "user device," or another term having an equivalent technical meaning.

Figure 1B:
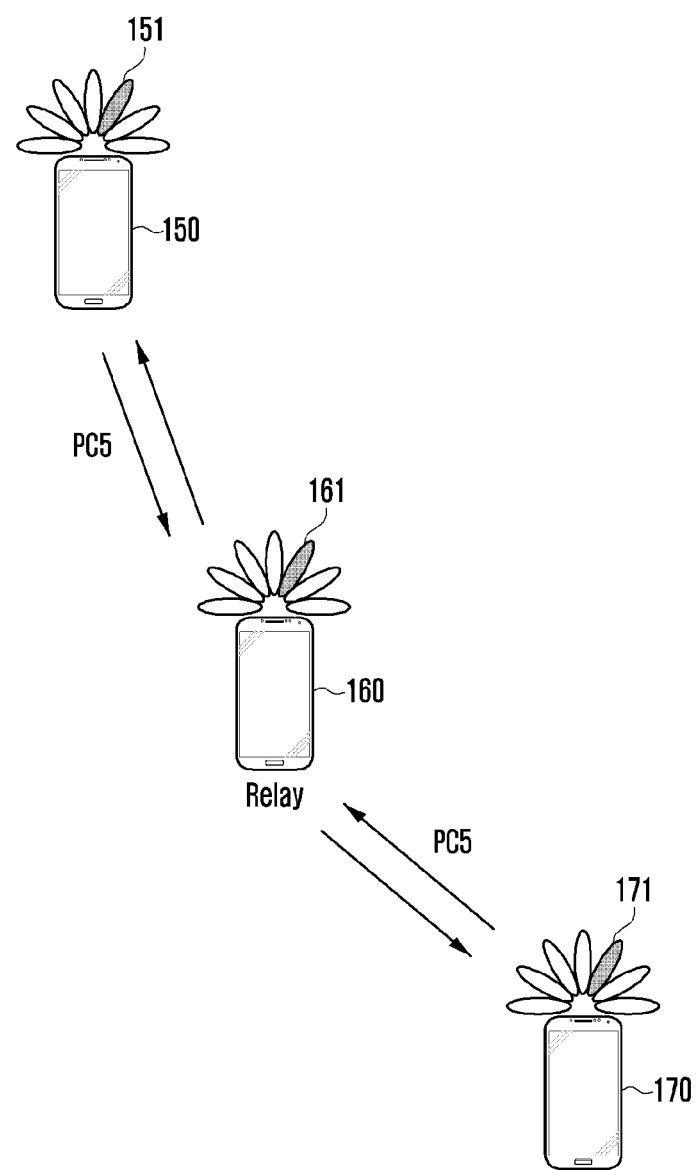
FIG. 1B illustrates a wireless communication system according to an embodiment of the present disclosure.

FIG. 1B illustrates a wireless communication system according to an embodiment of the present disclosure.

FIG. 1B illustrates a wireless communication system composed of UEs 150 and 170 and a sidelink relay 160 capable of relaying data transmission and reception between UEs as some of nodes using radio channels in a wireless communication system. Here, the sidelink relay 160 corresponds to a UE-to-UE (U2U) relay.

The relay 160 may perform communication with the UE 150 and the UE 170 through a radio channel. Here, the link between the relay 160 and the UE 150 and the link between the relay 160 and the UE 170 may be referred to as a sidelink, and the sidelink may be referred to as a PC5 interface.

The UE 150 and the UE 170 may each be a device used by a user, and can perform direct communication through a radio channel or communicate with the other UE through a radio channel via the relay 160. Here, the link between the UE 150 and the UE 170, the link between the UE 150 and the relay 160, and the link between the UE 170 and the relay 160 are referred to as a sidelink, and the sidelink may also be referred to as a PC5 interface.

At least one of the UE 150 or the UE 170 may be operated without user's involvement. That is, at least one of the UE 150 or the UE 170 may be a device that performs machine type communication (MTC), and may be not carried by a user. Each of the UE 150 and the UE 170 may be referred to as "terminal," "user equipment (UE)," "mobile station," "subscriber station," "remote terminal," "wireless terminal," "user device," or another term having an equivalent technical meaning.

In the following description, uplink or downlink and Uu interface may be used interchangeably, and sidelink and PC-5 may be used interchangeably.

The base station 110, the relay 120 or 160, and the UE 130, 140, 150, or 170 shown in FIGS. 1A and 1B may transmit and receive radio signals in the millimeter wave (mmWave) band (e.g., 28 GHz, 30 GHz, 38 GHZ, and 60 GHz). In this case, to improve the channel gain, the base station 110, the relay 120 or 160, and the UE 130, 140, 150, or 170 may perform beamforming. Here, beamforming may include transmit beamforming and receive beamforming. That is, the base station 110, the relay 120 or 160, and the UE 130, 140, 150, or 170 may give directivity to a transmission signal or a reception signal. To this end, the base station 110, the relay 120 or 160, and the UE 130, 140, 150, or 170 may select serving beams 112, 113, 121, 131, 141, 151, 161, and 171 through a beam search or beam management procedure. After the serving beams 112, 113, 121, 131, 141, 151, 161, and 171 are selected, subsequent communication may be performed through resources having a quasi co-located (QCL) relationship with the resources having transmitted the serving beams 112, 113, 121, 131, 141, 151, 161, and 171.

If large-scale characteristics of the channel carrying a symbol on a first antenna port can be inferred from the channel carrying a symbol on a second antenna port, the first antenna port and the second antenna port may be evaluated to be in a QCL relationship. For example, the large-scale characteristics may include at least one of delay spread, Doppler spread, Doppler shift, average gain, average delay, or spatial receiver parameter.

The UE 130, UE 140, UE 150, and UE 170 illustrated in FIGS. 1A and 1B may support vehicular communication. In the case of vehicular communication, standardization for vehicle-to-everything (V2X) technology based on the device-to-device (D2D) communication structure has been completed in 3GPP Release 14 and Release 15 for the LTE system, and standardization for V2X technology based on 5G NR has been completed in 3GPP Release 16. NR V2X supports unicast communication between UEs, groupcast (or multicast) communication, and broadcast communication. Further, unlike LTE V2X which aims to transmit and receive basic safety information necessary for the vehicle to drive on the road, NR V2X aims to provide more advanced services such as platooning, advanced driving, extended sensor, and remote driving. V2X services can be divided into basic safety services and advanced services.

The basic safety services may include vehicle notification (cooperative awareness message (CAM) or basic safety message (BSM)) services, and detailed services such as left turn notification, forward collision warning, emergency vehicle approaching, forward obstacle warning, and intersection movement information; and V2X information may be transmitted and received by using broadcast, unicast, or groupcast transmission. The advanced services not only have enhanced quality of service (QOS) requirements compared to the basic safety services but also require a method for transmitting and receiving V2X information by using unicast and groupcast in addition to broadcast so that V2X information can be transmitted and received within a specific vehicle group or between two vehicles. The advanced services may include detailed services such as platooning, autonomous driving, remote driving, and extended sensor-based V2X service. In addition, NR V2X can provide a public safety service by supporting direct communication between UEs in an area without network infrastructure.

In the following description, the sidelink (SL) refers to a signal transmission/reception path between UEs or a signal transmission/reception path between UE and relay, and may be used interchangeably with PC5 interface. Also, the base station is a main agent that allocates resources to the UE and relay, and it may be a base station that supports both V2X communication and regular cellular communication or a base station that supports only V2X communication. That is, the base station may mean an NR base station (e.g., gNB), an LTE base station (e.g., eNB), or a roadside unit (RSU). The terminal (UE) may include not only a general user equipment and a mobile station but also include a vehicle supporting vehicle-to-vehicle (V2V) communication, a vehicle or pedestrian handset (i.e., smartphone) supporting vehicle-to-pedestrian (V2P) communication, a vehicle supporting vehicle-to-network (V2N) communication, a vehicle supporting vehicle-to-infrastructure (V2I) communication, an RSU equipped with UE functionality, an RSU equipped with base station functionality, and an RSU equipped with some of base station functionality and some of UE functionality.

Meanwhile, in the disclosure, the UE may refer to a vehicle supporting vehicle-to-vehicle (V2V) communication, a vehicle or pedestrian handset (i.e., smartphone) supporting vehicle-to-pedestrian (V2P) communication, a vehicle supporting vehicle-to-network (V2N) communication, or a vehicle supporting vehicle-to-infrastructure (V2I) communication. The UE may refer to a user device supporting D2D communication of the public safety network.

Further, in the disclosure, the UE may refer to a road side unit (RSU) equipped with UE functionality, an RSU equipped with base station functionality, or an RSU equipped with some of base station functionality and some of UE functionality.

In the disclosure, the relay may refer to a vehicle supporting V2X communication or a user device supporting D2D communication of the public safety network. Further, in the disclosure, the relay may refer to a device equipped with UE functionality, a device equipped with base station functionality, or a device equipped with some of base station functionality and some of UE functionality.

Figure 2:
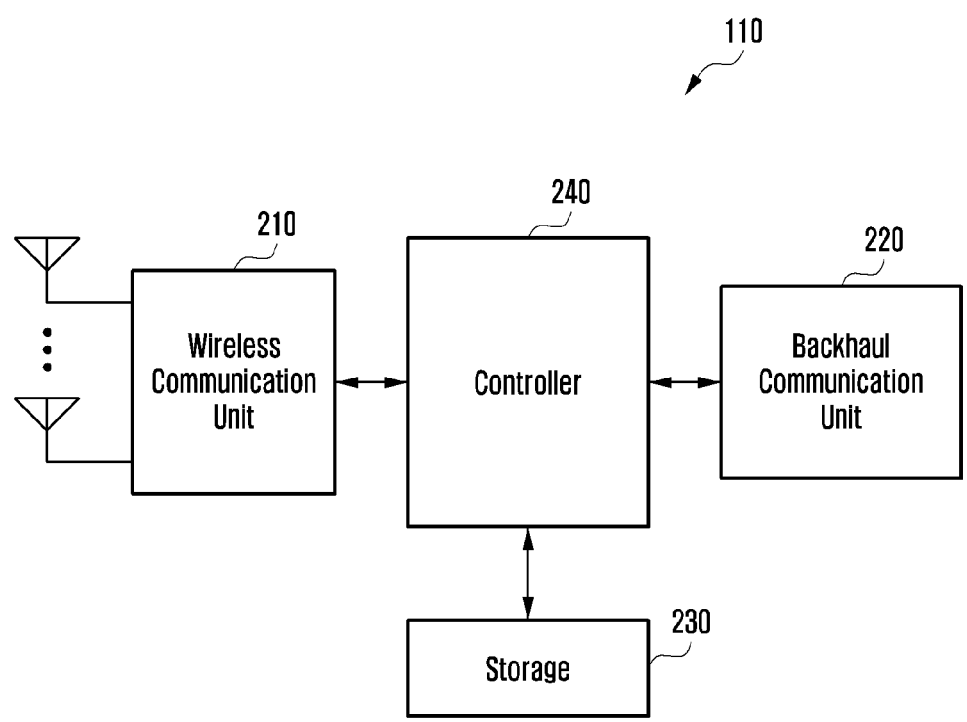
FIG. 2 illustrates a structure of a base station in a wireless communication system according to an embodiment of the present disclosure.

FIG. 2 illustrates a structure of a base station in a wireless communication system according to an embodiment of the present disclosure.

The configuration shown in FIG. 2 may be understood as a configuration of the base station 110. A term such as " . . . unit" or " . . . device" used herein means a unit that processes at least one function or operation, and may be implemented with hardware, software, or a combination thereof.

With reference to FIG. 2, the base station 110 may include a wireless communication unit 210, a backhaul communication unit 220, a storage 230, and a controller 240. However, the components of the base station 110 are not limited to those mentioned above. For example, the base station may include more or fewer components than those described above. Further, the wireless communication unit 210, the backhaul communication unit 220, the storage 230, and the controller 240 may be implemented in the form of a single chip. Also, the controller 240 may include one or more processors.

The wireless communication unit 210 may perform functions for transmitting and receiving signals through a radio channel. For example, the wireless communication unit 210 may perform conversion between a baseband signal and a bit stream in accordance with the physical layer specification of the system. For instance, for data transmission, the wireless communication unit 210 may generate complex symbols by encoding and modulating a transmission bit stream. Further, for data reception, the wireless communication unit 210 may reconstruct a reception bit stream by demodulating and decoding a baseband signal.

In addition, the wireless communication unit 210 performs up-conversion of a baseband signal into a radio frequency (RF) band signal and transmits the converted signal through an antenna, and performs down-conversion of an RF-band signal received through an antenna into a baseband signal. To this end, the wireless communication unit 210 may include a transmission filter, a reception filter, an amplifier, a mixer, an oscillator, a digital-to-analog converter (DAC), and an analog-to-digital converter (ADC). Also, the wireless communication unit 210 may include a plurality of transmission and reception paths. Further, the wireless communication unit 210 may include at least one antenna array composed of plural antenna elements.

In terms of hardware, the wireless communication unit 210 may be composed of a digital unit and an analog unit, and the analog unit may include a plurality of sub-units according to the operating power, operating frequency, and the like. The digital unit may be implemented with at least one processor (e.g., digital signal processor (DSP)).

The wireless communication unit 210 transmits and receives signals as described above. Hence, the whole or a part of the wireless communication unit 210 may be referred to as "transmitter," "receiver," or "transceiver." Also, in the following description, transmission and reception performed through a radio channel is used as having a meaning of processing performed by the wireless communication unit 210 as described above.

The backhaul communication unit 220 may provide an interface for performing communication with other nodes on the network. That is, the backhaul communication unit 220 may convert a bit stream to be transmitted from the base station 110 to another node, for example, another access node, another base station, upstream node, or core network, into a physical signal, and may convert a physical signal received from another node into a bit stream.

The storage 230 may store data such as basic programs, application programs, and configuration information for the operation of the base station 110. The storage 230 may be configured as a volatile memory, a non-volatile memory, or a combination thereof. In addition, the storage 230 may provide stored data in response to a request from the controller 240.

The controller 240 may control the overall operation of the base station 110. For example, the controller 240 may transmit and receive a signal through the wireless communication unit 210 or through the backhaul communication unit 220. Also, the controller 240 writes and reads data to and from the storage 230. In addition, the controller 240 may perform functions of a protocol stack required by the communication standard. According to another implementation example, the protocol stack may be included in the wireless communication unit 210. To this end, the controller 240 may include at least one processor. According to an embodiment, the controller 240 may control the base station 110 to perform operations according to embodiments to be described later.

Figure 3:
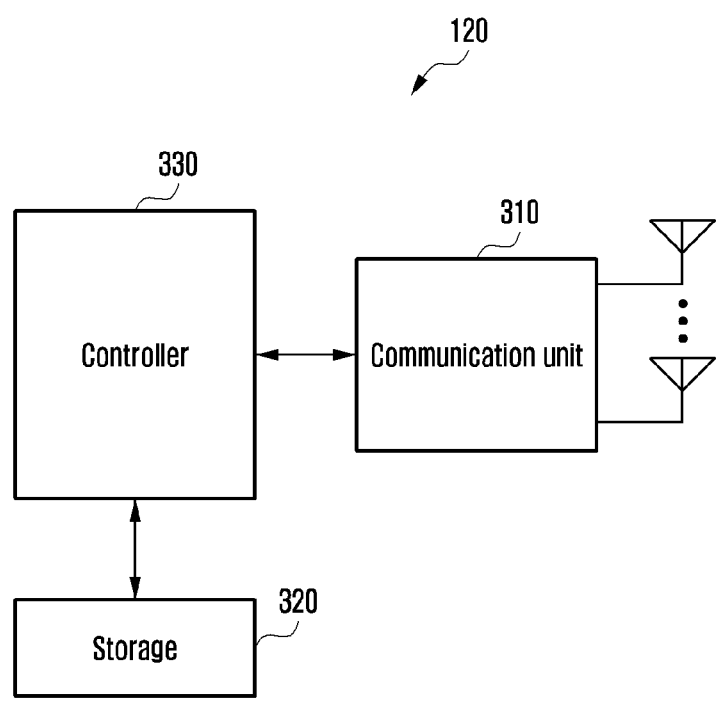
FIG. 3 illustrates a structure of a user equipment (UE) in a wireless communication system according to an embodiment of the present disclosure.

FIG. 3 illustrates a structure of a user equipment in a wireless communication system according to an embodiment of the present disclosure.

The configuration shown in FIG. 3 may be understood as a configuration of the UE 120, 130, 140, 150, 160, or 170. A term such as " . . . unit" or " . . . device" used herein means a unit that processes at least one function or operation, and may be implemented with hardware, software, or a combination thereof.

With reference to FIG. 3, the UE 120, 130, 140, 150, 160, or 170 may include a communication unit 310, a storage 320, and a controller 330. However, the components of the UE 120, 130, 140, 150, 160, or 170 are not limited to those mentioned above. For example, the UE 120, 130, 140, 150, 160, or 170 may include more or fewer components than those described above. Further, the communication unit 310, the storage 320, and the controller 330 may be implemented in the form of a single chip. Also, the controller 330 may include one or more processors.

The communication unit 310 performs functions for transmitting and receiving signals through a radio channel. For example, the communication unit 310 may perform conversion between a baseband signal and a bit stream in accordance with the physical layer specification of the system. For instance, for data transmission, the communication unit 310 generates complex symbols by encoding and modulating a transmission bit stream. Further, for data reception, the communication unit 310 may reconstruct a reception bit stream by demodulating and decoding a baseband signal. In addition, the communication unit 310 may perform up-conversion of a baseband signal into an RF band signal and transmit the converted signal through an antenna, and may perform down-conversion of an RF-band signal received through an antenna into a baseband signal. For example, the communication unit 310 may include a transmission filter, a reception filter, an amplifier, a mixer, an oscillator, a DAC, and an ADC.

In addition, the communication unit 310 may include a plurality of transmission and reception paths. Further, the communication unit 310 may include at least one antenna array composed of plural antenna elements. In terms of hardware, the communication unit 310 may be composed of a digital circuit and an analog circuit (e.g., radio frequency integrated circuit (RFIC)). Here, the digital circuit and the analog circuit may be implemented as a single package. Also, the communication unit 310 may include a plurality of RF chains. Further, the communication unit 310 may perform beamforming.

The communication unit 310 may transmit and receive signals as described above. Hence, the whole or a part of the communication unit 310 may be referred to as "transmitter," "receiver," or "transceiver." Also, in the following description, transmission and reception performed through a radio channel may be used as having a meaning of processing performed by the communication unit 310 as described above.

The storage 320 may store data such as basic programs, application programs, and configuration information for the operation of the UE 120, 130, 140, 150, 160, or 170. The storage 320 may be configured as a volatile memory, a non-volatile memory, or a combination thereof. In addition, the storage 320 provides stored data in response to a request from the controller 330.

The controller 330 controls the overall operation of the UE 120, 130, 140, 150, 160, or 170. For example, the controller 330 may transmit and receive signals through the communication unit 310. Also, the controller 330 writes and reads data to and from the storage 320. In addition, the controller 330 may perform the functions of a protocol stack required by the communication standard. To this end, the controller 330 may include at least one processor or microprocessor, or may be a part of a processor. Further, a part of the communication unit 310 and the controller 330 may be referred to as a communication processor (CP). According to an embodiment, the controller 330 may control the UE 120, 130, 140, 150, 160, or 170 to perform operations according to embodiments to be described later.

Figure 4:
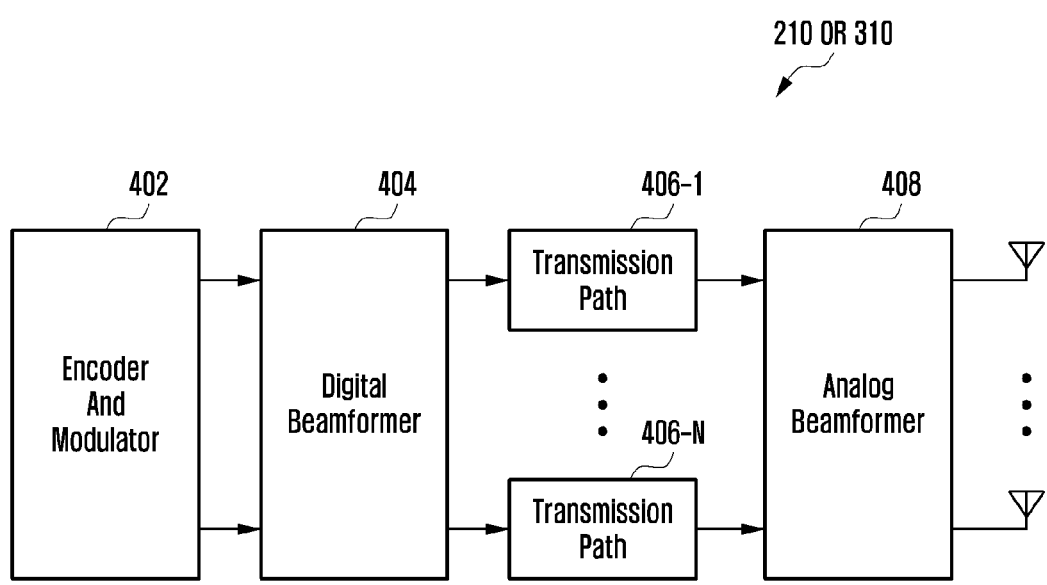
FIG. 4 illustrates a configuration of a communication unit in a wireless communication system according to an embodiment of the present disclosure.

FIG. 4 illustrates a configuration of a communication unit in a wireless communication system according to an embodiment of the present disclosure.

FIG. 4 illustrates a detailed configuration of the wireless communication unit 210 in FIG. 2 or the communication unit 310 in FIG. 3. Specifically, FIG. 4 shows components for performing beamforming as a part of the wireless communication unit 210 in FIG. 2 or the communication unit 310 in FIG. 3.

With reference to FIG. 4, the wireless communication unit 210 or the communication unit 310 may include an encoder and modulator 402, a digital beamformer 404, a plurality of transmission paths 406-1 to 406-N, and an analog beamformer 408.

The encoder and modulator 402 may perform channel encoding. For channel encoding, at least one of a low density parity check (LDPC) code, a convolution code, or a polar code may be used. The encoder and modulator 402 generates modulation symbols by performing constellation mapping.

The digital beamformer 404 may perform beamforming on a digital signal (e.g., modulation symbols). To this end, the digital beamformer 404 multiplies the modulation symbols by beamforming weights. Here, the beamforming weights are used to change the magnitude and phase of a signal, and may be referred to as "precoding matrix" or "precoder." The digital beamformer 404 may output the digitally beamformed modulation symbols to the plural transmission paths 406-1 to 406-N. Here, according to the multiple input multiple output (MIMO) transmission scheme, the modulation symbols may be multiplexed, or the same modulation symbols may be provided to the multiple transmission paths 406-1 to 406-N.

The plural transmission paths 406-1 to 406-N may convert digitally beamformed digital signals into an analog signal. To this end, each of the plural transmission paths 406-1 to 406-N may include an inverse fast Fourier transform (IFFT) calculator, a cyclic prefix (CP) inserter, a DAC, and an up converter. The CP inserter is for orthogonal frequency division multiplexing (OFDM), and may be omitted when another physical layer scheme (e.g., filter bank multi-carrier (FBMC)) is applied. That is, the plural transmission paths 406-1 to 406-N may provide independent signal processing processes for a plurality of streams generated through digital beamforming. However, depending on the implementation scheme, some of the components of the plural transmission paths 406-1 to 406-N may be used in common.

The analog beamformer 408 may perform beamforming on an analog signal. To this end, the analog beamformer 408 may multiply analog signals by beamforming weights. Here, the beamforming weights are used to change the magnitude and phase of a signal. Specifically, the analog beamformer 408 may be configured in various ways according to the connection structure between the plural transmission paths 406-1 to 406-N and antennas. For example, each of the plural transmission paths 406-1 to 406-N may be connected to one antenna array. As another example, the plural transmission paths 406-1 to 406-N may be connected to one antenna array. As another example, the plural transmission paths 406-1 to 406-N may be adaptively connected to one antenna array or to two or more antenna arrays.

Figure 5:
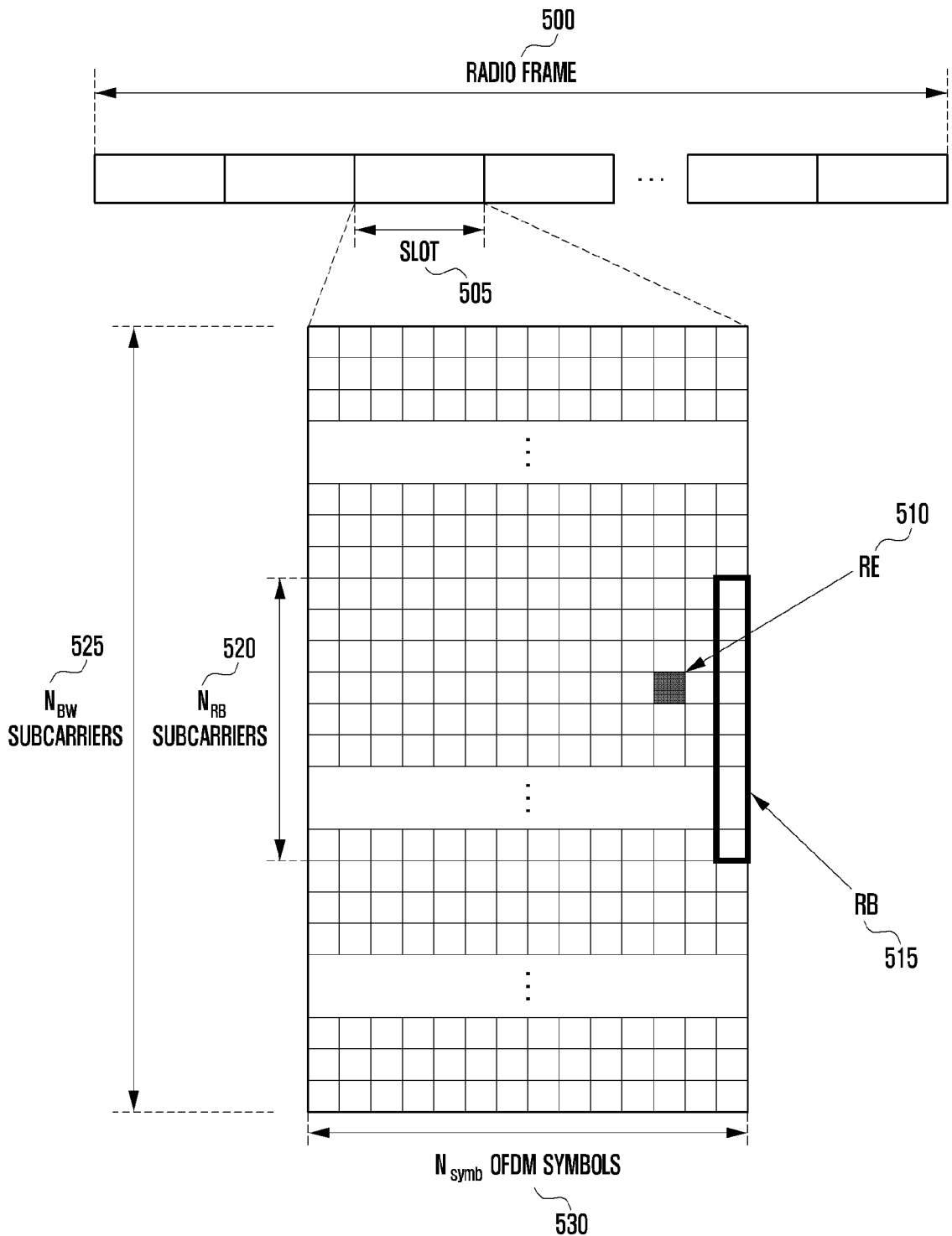
FIG. 5 illustrates a structure of time-frequency resources in a wireless communication system according to an embodiment of the present disclosure.

FIG. 5 illustrates a structure of time-frequency resources in a wireless communication system according to an embodiment of the present disclosure.

With reference to FIG. 5, in the radio resource region, the horizontal axis represents the time domain and the vertical axis represents the frequency domain. The minimum transmission unit in the time domain is OFDM (orthogonal frequency division multiplexing) or DFT-S-OFDM (discrete Fourier transform spread OFDM) symbols, and Nsymb OFDM or DFT-S-OFDM symbols 530 may be included in one slot 505. In the NR system, unlike the slot, the length of a subframe may be defined as 1.0 ms, and the length of a radio frame 500 may be defined as 10 ms. The minimum transmission unit in the frequency domain is subcarriers, and the entire system transmission bandwidth may include a total of NBW subcarriers 525. Specific values such as Nsymb and NBW may be variably applied depending on the system.

The basic unit of the time-frequency resource region is a resource element (RE) 510, which may be represented by an OFDM or DFT-S-OFDM symbol index and a subcarrier index. A resource block (RB) 515 may be defined as NRB consecutive subcarriers 520 in the frequency domain. In general, the minimum transmission unit of data is an RB, and Nsymb=14 and NRB=12 in the NR system.

The structure of time-frequency resources as shown in FIG. 5 may be applied to the Uu interface. In addition, the time-frequency resource structure as shown in FIG. 5 may be similarly applied to the sidelink.

The sidelink relay may be authenticated to be used in at least one of a specific service, a specific UE, a specific sidelink flow, a specific sidelink bearer, a specific unicast link, a specific source identifier, or a specific destination identifier. The sidelink relay can establish a direct connection to a UE authenticated at the time of installation. In an embodiment, the sidelink relay may transmit a sidelink relay discovery message and perform a sidelink direct connection establishment procedure with an authenticated UE. In another embodiment, the sidelink relay may receive a sidelink relay discovery message from an authenticated UE, transmit a sidelink relay discovery message to the authenticated UE, and perform a sidelink direct connection establishment procedure with the corresponding UE.

In various embodiments, the sidelink relay discovery message may be understood as a message mutually transmitted to initiate a sidelink relay discovery procedure between a sidelink relay and a UE, and may include a discovery message or a discovery request message. Configuration information necessary for a sidelink relay UE and a sidelink remote UE to transmit or receive a sidelink relay discovery message may be obtained from the base station or may be set in advance. A UE may be authenticated to use a sidelink direct connection in at least one of a specific service, a specific UE, a specific sidelink flow, a specific sidelink bearer, a specific unicast link, a specific source identifier, or a specific destination identifier. In an embodiment, a UE may transmit a sidelink discovery message and perform a sidelink direct connection establishment procedure with an authenticated UE in order to search for another UE capable of performing sidelink direct connection establishment. In another embodiment, a UE may receive a sidelink discovery message from an authenticated UE, transmit a sidelink discovery message to the authenticated UE, and perform a sidelink direct connection establishment procedure with the corresponding UE.

When the UE performs data transmission and reception to and from the network through a connection to a sidelink relay UE or the UE performs data transmission and reception through direct connection with the network, the UE may switch the connection from a connection to the network through a sidelink relay UE to a direct connection to the network or may switch the connection from a direct connection to the network to a connection to the network through a sidelink relay UE.

To determine whether the UE needs to switch from a connection to the network through a sidelink relay UE to a direct connection to the network or whether the UE needs to switch from a direct connection to the network to a connection to the network through a sidelink relay UE, the base station may refer to a signal strength measurement value for the Uu interface between the UE and the base station (cell) and a signal strength measurement value for the PC5 interface between the UE and the relay UE.

The base station may configure the UE with a measurement and reporting configuration for measuring the signal strength of the Uu interface, and the base station may configure the UE with a measurement and reporting configuration for measuring the signal strength of the PC5 interface.

When the UE is directly connected to the network and is configured with measurement and reporting for measuring the signal strength of the PC5 interface with a relay UE, the UE may measure the signal strength of a sidelink discovery message transmitted by the relay UE and report the measurement result to the base station.

When the UE is connected to the network through a relay UE and is configured with measurement and reporting for measuring the signal strength of the PC5 interface with the relay UE, the UE may measure the signal strength of a signal transmitted and received through a unicast connection with the relay UE and report the measurement result to the base station.

There may be a case in which the UE cannot measure the signal strength of a signal transmitted and received through a unicast connection with a relay UE, such as a case where there is no signal transmitted or received through a unicast connection between the UE and the relay UE. At this time, instead of measuring a signal transmitted and received through a unicast connection with the relay UE, the UE may measure the signal strength of a sidelink discovery message transmitted by the relay UE and report the measurement result to the base station. When it is determined that the UE cannot measure a signal transmitted and received through a unicast connection with a relay UE, a signal strength measurement and reporting configuration may be provided to the UE so as to enable the UE to measure the signal strength of a sidelink discovery message transmitted by the sidelink relay UE.

When the UE is configured to measure the signal strength of a sidelink discovery message transmitted by a sidelink relay UE and it is determined that the signal transmitted and received through a unicast connection with the sidelink relay UE cannot be measured, the UE may measure the signal strength of a sidelink discovery message in the sidelink frequency, sidelink bandwidth part (BWP), sidelink carrier, and sidelink transmission resource pool configured for the sidelink relay UE to transmit a sidelink discovery message. Measurement and reporting configuration information for the sidelink discovery message of a sidelink relay UE may be provided to the UE by the base station or the sidelink relay.

Figure 6A:
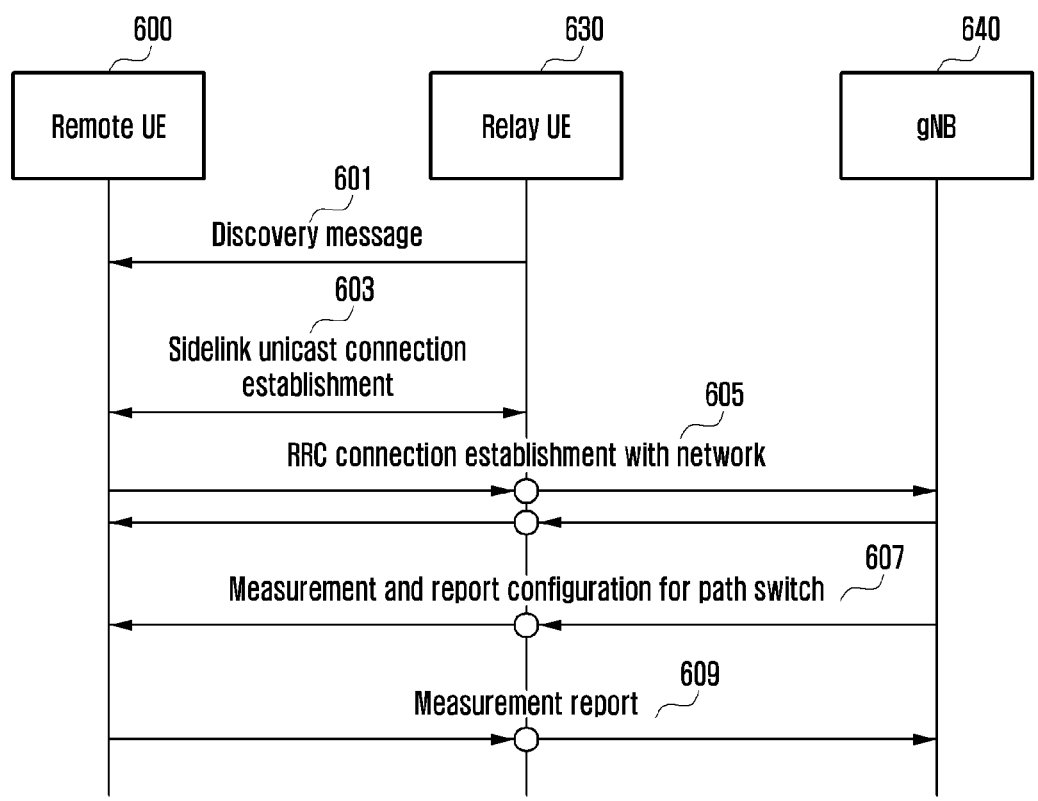
FIG. 6A illustrates signal flows between remote UE, relay UE, and base station for processing sidelink measurement and reporting information to support mobility of the remote UE according to an embodiment of the present disclosure.

FIG. 6A illustrates signal flows between remote UE, relay UE, and base station for processing sidelink measurement and reporting information to support mobility of the remote UE according to an embodiment of the present disclosure.

With reference to FIG. 6A, at step 601, the (remote) UE 600 may receive a sidelink discovery message (discovery signal) transmitted by the relay UE 630. The UE 600 may determine whether to directly connect to the base station 640 or to connect to the base station 640 via the relay UE 630 based on a signal strength measurement value for a sidelink discovery message transmitted by the relay UE 630, a signal strength measurement value for the base station 640 measured by the UE 600, and a relay selection criterion set in the upper layer of the UE 600.

Upon determining to connect to the base station 640 via the relay UE 630, at step 603, the UE 600 may determine the relay UE 630 as a serving relay UE and establish a sidelink unicast connection to the relay UE 630.

Then, at step 605, the UE 600 may establish (configure) a radio resource control (RRC) connection to the base station 640 via the relay UE 630.

At step 607, to support mobility of the UE 600, the base station 640 may transmit configuration information for signal strength measurement and reporting to the UE 600. Here, according to an embodiment, configuration information signaling for signal strength measurement and reporting configured by the base station 640 to the UE 600 may be delivered to the UE 600 through a sidelink unicast connection with the relay UE 630. The configuration information for signal strength measurement and reporting at step 607 may include at least one or a combination of a signal strength measurement and report configuration for the sidelink and a signal strength measurement and report configuration for the Uu link to be applied by the UE 600.

The UE 600 may perform at least one or a combination of measuring the signal strength of the sidelink and measuring the signal strength of the Uu link based on the signal strength measurement and report configuration information at step 607. For example, the UE 600 may measure the sidelink signal strength by measuring a signal transmitted and received through the sidelink unicast connection with the relay UE 630.

The UE 600 may perform at least one or a combination of signal strength measurement reporting for the sidelink and signal strength measurement reporting for the Uu link based on the signal strength measurement and report configuration information at step 607. At step 609, the UE 600 may report the signal strength measurement result to the base station 640 via the sidelink unicast connection with the relay UE 630.

Figure 6B:
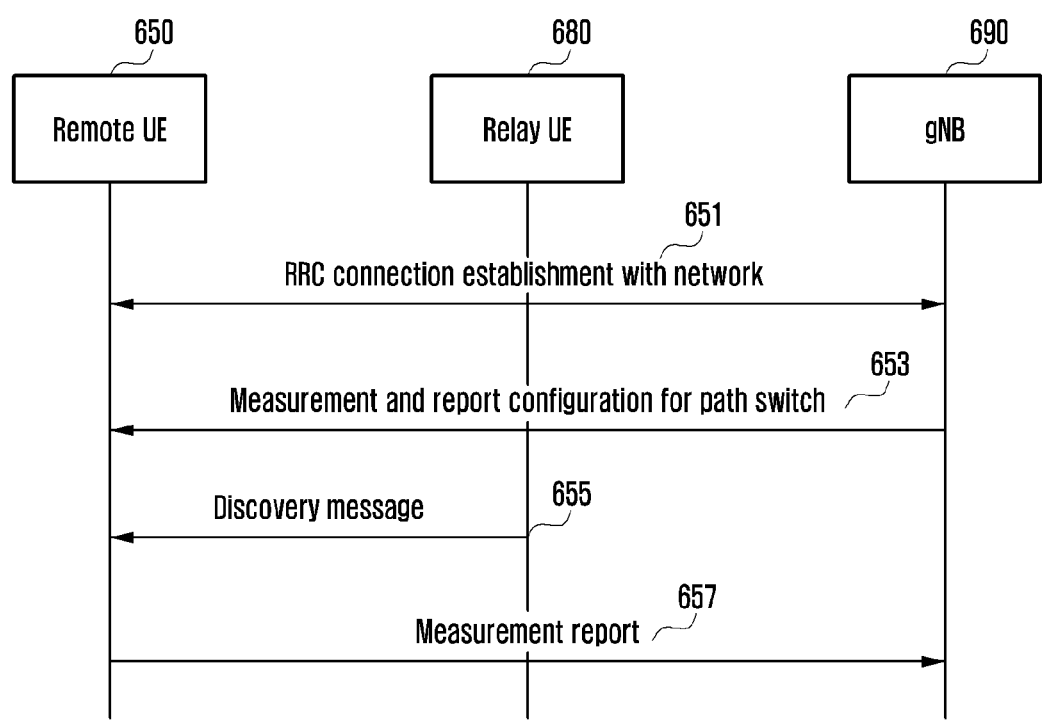
FIG. 6B illustrates signal flows between remote UE, relay UE, and base station for processing sidelink measurement and reporting information to support mobility of the remote UE according to another embodiment of the present disclosure.

FIG. 6B illustrates signal flows between remote UE, relay UE, and base station for processing sidelink measurement and reporting information to support mobility of the remote UE according to another embodiment of the present disclosure.

With reference to FIG. 6B, the (remote) UE 650 may determine whether to directly connect to the base station 690 or to connect to the base station 690 via the relay UE 680 on the basis of a signal strength measurement value for a sidelink discovery message transmitted by the relay UE 680 (however, FIG. 6B does not show the operation of the UE 650 to receive a sidelink discovery message transmitted by the relay UE 680 prior to step 651), a signal strength measurement value for the base station 690 measured by the UE 650, and a relay selection criterion set in the upper layer of the UE 650.

Upon determining to directly connect to the base station 690, at step 651, the UE 650 may determine the base station 690 as a serving cell or a serving base station and establish an RRC connection to the base station 690.

At step 653, to support mobility of the UE 650, the base station 690 may transmit configuration information for signal strength measurement and reporting to the UE 650. The configuration information for signal strength measurement and reporting at step 653 may include at least one or a combination of a signal strength measurement and report configuration for the sidelink and a signal strength measurement and report configuration for the Uu link to be applied by the UE 650.

The UE 650 may perform at least one or a combination of measuring the signal strength of the sidelink and measuring the signal strength of the Uu link based on the signal strength measurement and report configuration information at step 653. For example, at step 655, the UE 650 may measure the signal strength of a sidelink discovery message transmitted by the relay UE 680.

The UE 650 may perform at least one or a combination of signal strength measurement reporting for the sidelink and signal strength measurement reporting for the Uu link based on the signal strength measurement and report configuration information at step 653. At step 657, the UE 650 may report the signal strength measurement result to the base station 690.

According to an embodiment, in the case where the UE 600 measures and reports the signal strength for the sidelink with the relay UE 630 at steps 607 to 609 in FIG. 6A, when it is determined that there is signaling transmitted and received through the sidelink unicast connection between the UE 600 and the relay UE 630, the UE 600 may measure the signal strength for the sidelink with the relay UE 630 and report the measured value. According to an embodiment, since there is no signaling transmitted and received through the sidelink unicast connection between the UE 600 and the relay UE 630, when it is determined that the UE 600 cannot measure the signal strength for the sidelink with the relay UE 630, the UE 600 may be configured so that it can measure the signal strength of a sidelink discovery message transmitted by the relay UE 630 and report the measured value.

A description will be given of embodiments in which a sidelink signal strength measurement and report configuration is provided to the UE 600 so that the sidelink signal strength can be measured for a sidelink discovery message transmitted by the relay UE 630 with reference to FIGS. 7A and 7B when it is determined that the UE 600 cannot measure the sidelink signal strength for a sidelink unicast connection although the sidelink unicast connection has been established between the UE 600 and the relay UE 630.

Figure 7A:
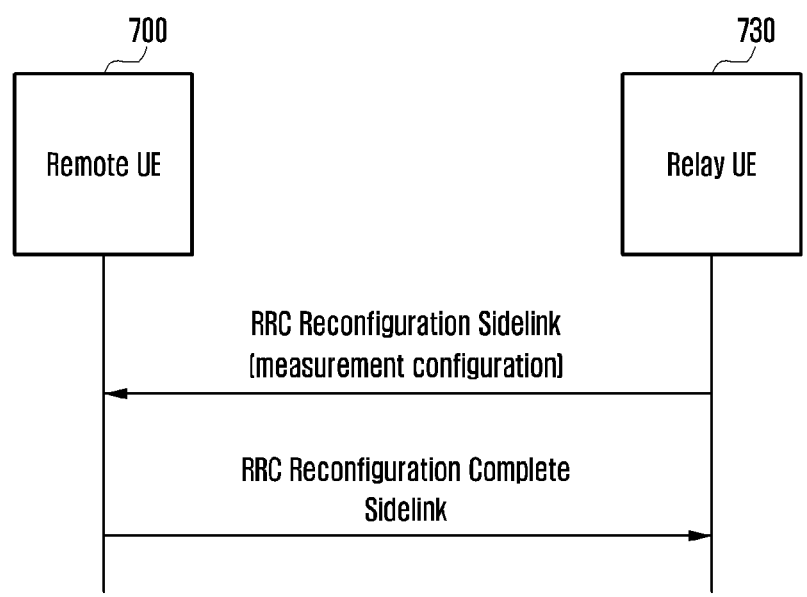
FIG. 7A illustrates signal flows for configuring sidelink measurement and reporting to support mobility of a remote UE according to an embodiment of the present disclosure.

FIG. 7A illustrates signal flows for configuring sidelink measurement and reporting to support mobility of a remote UE according to an embodiment of the present disclosure.

With reference to FIG. 7A, at step 701, the relay UE 730 may transmit, to the UE 700 to which a sidelink unicast connection is established, a message, for example, an RRC reconfiguration sidelink message, including configuration information for measuring the sidelink signal strength as to a sidelink discovery message transmitted by the relay UE 730 when it is determined that the UE 700 cannot measure the sidelink signal strength as to signaling transmitted and received through the sidelink unicast connection with the relay UE 730. The signal strength measurement configuration information for the sidelink discovery message transmitted at step 701 may include information shown in Table 1 below.

TABLE 1

```
RRCReconfigurationSidelink-IEs ::= SEQUENCE {
    slrb-ConfigToAddModList SEQUENCE (SIZE (1..maxNrofSLRB)) OF SLRB-Config
OPTIONAL, -- Need N
    slrb-ConfigToReleaseList SEQUENCE (SIZE (1..maxNrofSLRB)) OF SLRB-PC5-
ConfigIndex OPTIONAL, -- Need N
        sl-MeasConfig-r16 SetupRelease {SL-MeasConfig-r16} OPTIONAL, -- Need M
        sl-MeasConfig-r17 SetupRelease {SL-MeasConfig-r17} OPTIONAL, -- Need M
        sl-CSI-RS-Config-r16 SetupRelease {SL-CSI-RS-Config-r16} OPTIONAL, -- Need M
        sl-ResetConfig-r16 ENUMERATED {true} OPTIONAL, -- Need N
        sl-LatencyBoundCSI-Report-r16 INTEGER (3..160) OPTIONAL, -- Need M
        lateNonCriticalExtension OCTET STRING OPTIONAL,
        nonCriticalExtension SEQUENCE { } OPTIONAL
}
SL-MeasConfig-r17 ::= SEQUENCE {
    sl-MeasObjectToRemoveList-r17 SL-MeasObjectToRemoveList-r17 OPTIONAL, -- Need
N
    sl-MeasObjectToAddModList-r17 SL-MeasObjectList-r17 OPTIONAL, -- Need N
    sl-MeasIdToRemoveList-r17 SL-MeasIdToRemoveList-r17 OPTIONAL, -- Need N
    sl-MeasIdToAddModList-r17 SL-MeasIdList-r17 OPTIONAL, -- Need N
    sl-QuantityConfig-r17 SL-QuantityConfig-r17 OPTIONAL, -- Need M
    ...
}
SL-MeasObjectToRemoveList-r17 ::= SEQUENCE (SIZE (1..maxNrofSL-ObjectId-r17))
OF SL-MeasObjectId-r17
SL-MeasIdToRemoveList-r17 ::= SEQUENCE (SIZE (1..maxNrofSL-MeasId-r17)) OF SL-
MeasId-r17
SL-MeasConfig-r16 ::= SEQUENCE {
    sl-MeasObjectToRemoveList-r16 SL-MeasObjectToRemoveList-r16 OPTIONAL, -- Need
N
    sl-MeasObjectToAddModList-r16 SL-MeasObjectList-r16 OPTIONAL, -- Need N
    sl-ReportConfigToRemoveList-r16 SL-ReportConfigToRemoveList-r16 OPTIONAL, --
Need N
    sl-ReportConfigToAddModList-r16 SL-ReportConfigList-r16 OPTIONAL, -- Need N
    sl-MeasIdToRemoveList-r16 SL-MeasIdToRemoveList-r16 OPTIONAL, -- Need N
    sl-MeasIdToAddModList-r16 SL-MeasIdList-r16 OPTIONAL, -- Need N
    sl-QuantityConfig-r16 SL-QuantityConfig-r16 OPTIONAL, -- Need M
    ...
}
```

TABLE 1-continued

```
SL-MeasObjectToRemoveList-r16 ::= SEQUENCE (SIZE (1..maxNrofSL-ObjectId-r16))
OF SL-MeasObjectId-r16
SL-ReportConfigToRemoveList-r16 ::= SEQUENCE (SIZE (1..maxNrofSL-
ReportConfigId-r16)) OF SL-ReportConfigId-r16
SL-MeasIdToRemoveList-r16 ::= SEQUENCE (SIZE (1..maxNrofSL-MeasId-r16)) OF SL-
MeasId-r16
```

The information in Table 1 may include a sidelink measurement and report configuration (sl-MeasConfig-r16) for a sidelink unicast connection established between the UE 700 and the relay UE 730. The sidelink measurement and report configuration for the sidelink unicast connection can be used for sidelink transmission power control between the UE 700 and the relay UE 730. For determining the path switch of the UE 700, the sidelink measurement and report configuration for a sidelink unicast connection established between the UE 700 and the relay UE 730 may be provided through a sidelink measurement and report configuration (sl-MeasObject) of an RRC reconfiguration message transmitted from the base station (not shown) to the UE 700. The information in Table 1 may include configuration information (sl-MeasConfig-r17) that allows the UE 700 to perform sidelink measurement on a sidelink discovery message transmitted by the relay UE 730 when it is determined that the UE 700 cannot perform sidelink measurement for the sidelink unicast connection with the relay UE 730.

As a reply to the RRC reconfiguration sidelink message at step 701, at step 703, the UE 700 may transmit a response message, for example, an RRC reconfiguration complete sidelink message to the relay UE 730.

According to an embodiment, when it is determined that the UE 700 can perform sidelink measurement for the sidelink unicast connection with the relay UE 730, the UE 700 may perform, by using a sidelink measurement and report configuration of the RRC reconfiguration message transmitted from the base station (not shown) to the UE 700, sidelink measurement on signaling transmitted and received through the sidelink unicast connection with the relay UE 730 and report the measurement value to the base station. According to an embodiment, when it is determined that the UE 700 cannot perform sidelink measurement for the sidelink unicast connection with the relay UE 730, the UE 700 may use configuration information (sl-MeasConfig-r17) allowing sidelink measurement on a sidelink discovery message included in the RRC reconfiguration sidelink message received at step 701 to measure the signal strength of a sidelink discovery message transmitted by the relay UE 730. The UE 700 may transmit a signal strength measurement result report for the sidelink discovery message to the base station, in which case the UE 700 may use a sidelink reporting configuration of the RRC reconfiguration message transmitted from the base station to the UE 700.

Figure 7B:
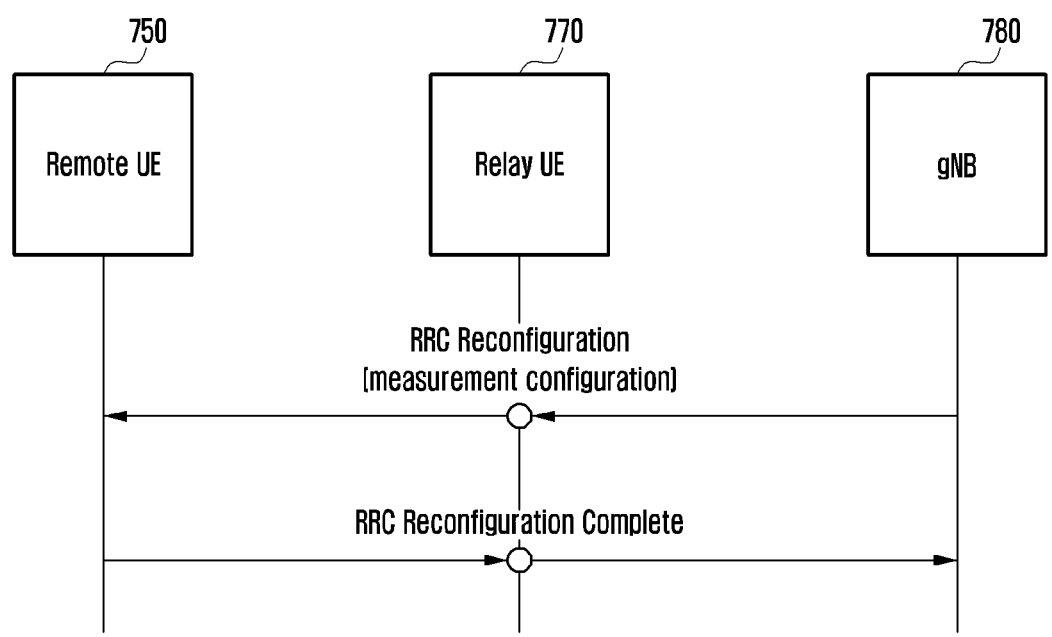
FIG. 7B illustrates signal flows for configuring sidelink measurement and reporting to support mobility of a remote UE according to another embodiment of the present disclosure.

FIG. 7B illustrates signal flows for configuring sidelink measurement and reporting to support mobility of a remote UE according to another embodiment of the present disclosure.

With reference to FIG. 7B, at step 751, the base station 780 may provide configuration information for signal strength measurement and reporting on the sidelink and/or the Uu link to the UE 750 for which a sidelink unicast connection with the relay UE 770 is established. The signal strength measurement and report configuration information may be included in an RRC reconfiguration message transmitted from the base station 780 to the UE 750, and may be relayed and transmitted through the sidelink unicast connection between the UE 750 and the relay UE 770. The base station 780 may provide configuration information for measuring and reporting the sidelink signal strength as to signaling transmitted/received through the sidelink unicast connection between the UE 750 and the relay UE 770 by use of the RRC reconfiguration message at step 751. The base station 780 may provide configuration information, which enables the UE 750 to measure and report the sidelink signal strength for a sidelink discovery message transmitted from the relay UE 770 when it is determined that the UE 750 cannot measure the sidelink signal strength for signaling transmitted and received through the sidelink unicast connection with the relay UE 770, by use of the RRC reconfiguration message at step 751. The signal strength measurement and report configuration information for a sidelink discovery message at step 751 may include information shown in Table 2 below.

TABLE 2

```
SL-MeasObjectList-r16 ::= SEQUENCE (SIZE (1..maxNrofSL-ObjectId-r16)) OF SL-
MeasObjectInfo-r16
SL-MeasObjectInfo-r16 ::= SEQUENCE {
    sl-MeasObjectId-r16 SL-MeasObjectId-r16,
    sl-MeasObject-r16 SL-MeasObject-r16,
    sl-MeasObject-r17 SL-MeasObject-r17,
    ...
}
SL-MeasObjectId-r16 ::= INTEGER (1..maxNrofSL-ObjectId-r16)
SL-MeasObject-r16 ::= SEQUENCE {
    frequency InfoSL-r16 ARFCN-ValueNR,
    ...
}
//SL measurement objective for measuring SD-RSRP (sidelink relay discovery message),
the frequency info indicates SL frequency includes SL discovery resource (shared
comm/discovery resource pool or dedicated discovery resource pool)
SL-MeasObjectId-r17 ::= INTEGER (1..maxNrofSL-ObjectId-r17)
SL-MeasObject-r17 ::= SEQUENCE {
        frequency InfoSL-r17
            ARFCN-ValueNR,
    ...
```

TABLE 2-continued

```
}
SL-MeasIdList-r16 ::= SEQUENCE (SIZE (1..maxNrofSL-MeasId-r16)) OF SL-
MeasIdInfo-r16
SL-MeasIdInfo-r16 ::= SEQUENCE {
    sl-MeasId-r16 SL-MeasId-r16,
    sl-MeasObjectId-r16 SL-MeasObjectId-r16,
    sl-ReportConfigId-r16 SL-ReportConfigId-r16,
    ...
}
SL-MeasId-r16 ::= INTEGER (1..maxNrofSL-MeasId-r16)
//SL measurement ID info for measuring SD-RSRP (sidelink relay discovery message)
SL-MeasIdList-r17 ::= SEQUENCE (SIZE (1..maxNrofSL-MeasId-r17)) OF SL-
MeasIdInfo-r17
SL-MeasIdInfo-r17 ::= SEQUENCE {
    sl-MeasId-r17 SL-MeasId-r17,
    sl-MeasObjectid-r17 SL-MeasObjectId-r17,
    ...
}
SL-MeasId-r17 ::= INTEGER (1..maxNrofSL-MeasId-r17)
```

The information in Table 2 may include a sidelink measurement and report configuration (sl-MeasObject-r16) for a sidelink unicast connection established between the UE 750 and the relay UE 770. The information in Table 2 may include configuration information (sl-MeasObject-r17) that enables the UE 750 to perform sidelink measurement and reporting on a sidelink discovery message transmitted from the relay UE 770 when it is determined that the UE 750 cannot perform sidelink measurement for the sidelink unicast connection with the relay UE 770.

As a reply to the RRC reconfiguration message at step 751, at step 753, the UE 750 may transmit a response message, for example, an RRC reconfiguration complete message to the base station 780. Here, the response message may be transmitted to the base station 780 through a sidelink unicast connection between the UE 750 and the relay UE 770.

According to an embodiment, when it is determined that the UE 750 can perform sidelink measurement for the sidelink unicast connection with the relay UE 770, the UE 750 may perform, by using the sidelink measurement and report configuration for the sidelink unicast connection among the sidelink measurement and report configuration included in the RRC reconfiguration message transmitted from the base station 780 to the UE 750, sidelink measurement on signaling transmitted and received through the sidelink unicast connection with the relay UE 770 and report the measurement value to the base station 780. According to an embodiment, when it is determined that the UE 750 cannot perform sidelink measurement for the sidelink unicast connection with the relay UE 770, the UE 750 may perform, by using the sidelink measurement and report configuration for a sidelink discovery message among the sidelink measurement and report configuration included in the RRC reconfiguration message received at step 751, sidelink measurement on the sidelink discovery message of the sidelink relay 770 and report the measurement value to the base station 780.

In the above description with reference to Table 1 and Table 2, the base station or sidelink relay UE has been described as configuring configuration information to the UE as a separate IE, where the configuration information enables, when the UE is connected to the side link relay (side link relay UE), the UE to perform sidelink measurement for signaling transmitted and received through the sidelink unicast connection with the sidelink relay UE and report the measurement value, or where the configuration information enables, when it is determined that the UE cannot perform sidelink measurement for signaling transmitted and received through the sidelink unicast connection with the sidelink relay UE, the UE to perform sidelink measurement on a sidelink discovery message transmitted by the sidelink relay UE and report the measurement value.

In another embodiment, instead of configuring, as a separate IE, the configuration information enabling, when it is determined that the UE cannot perform sidelink measurement for signaling transmitted and received through a sidelink unicast connection with the sidelink relay UE, the UE to perform sidelink measurement on a sidelink discovery message transmitted by the sidelink relay UE and report the measurement value; the base station may transmit, to the UE, an RRC reconfiguration message including information indicating whether the sidelink measurement and report configuration configured for signaling transmitted and received through the sidelink unicast connection can be applied to performing sidelink measurement on a sidelink discovery message transmitted by the sidelink relay UE and reporting the measurement value when it is determined that the UE cannot perform sidelink measurement for signaling transmitted and received through the sidelink unicast connection with the sidelink relay UE. Indication information, notified by the base station, indicating whether the sidelink measurement and report configuration set for signaling transmitted and received through a sidelink unicast connection can be applied to the sidelink discovery message may include information shown in Table 3 below.

If it is determined that the UE cannot perform sidelink measurement for signaling transmitted and received through a sidelink unicast connection with the sidelink relay UE, the UE may determine whether the RRC reconfiguration message obtained from the base station includes indication information indicating whether the sidelink measurement and report configuration set for signaling transmitted and received through a sidelink unicast connection can be applied to a sidelink discovery message.

Upon determining that there is indication information indicating that the sidelink measurement and report configuration set for signaling transmitted and received through a sidelink unicast connection can be applied to a sidelink discovery message, the UE may perform sidelink measurement on a sidelink discovery message transmitted by the sidelink relay UE and report the measured value to the base station.

Upon determining that there is no indication information indicating that the sidelink measurement and report configuration set for signaling transmitted and received through a sidelink unicast connection can be applied to a sidelink discovery message, the UE may determine whether a sidelink measurement and report configuration for a sidelink discovery message transmitted by the sidelink relay UE is separately included, and may perform, based on the sidelink measurement and report configuration for a sidelink discovery message, measurement on a sidelink discovery message transmitted by the sidelink relay UE and report the measured value to the base station.

TABLE 3

```
RRCReconfigurationSidelink-IEs-r16 ::= SEQUENCE {
    slrb-ConfigToAddModList-r16 SEQUENCE (SIZE (1..maxNrofSLRB-r16)) OF SLRB-
Config-r16      OPTIONAL, -- Need N
    slrb-ConfigToReleaseList-r16 SEQUENCE (SIZE (1..maxNrofSLRB-r16)) OF SLRB-PC5-
ConfigIndex-r16 OPTIONAL, -- Need N
    sl-MeasConfig-r16 SetupRelease {SL-MeasConfig-r16} OPTIONAL, -- Need M
sl-MeasConfig-r17      SetupRelease {SL-MeasConfig-r17} OPTIONAL, -- Need M
    sl-CSI-RS-Config-r16 SetupRelease {SL-CSI-RS-Config-r16} OPTIONAL, -- Need M
    sl-ResetConfig-r16 ENUMERATED {true} OPTIONAL, -- Need N
    sl-LatencyBoundCSI-Report-r16 INTEGER (3..160) OPTIONAL, -- Need M
    lateNonCriticalExtension OCTET STRING OPTIONAL,
    nonCriticalExtension SEQUENCE { } OPTIONAL
}
SL-MeasConfig-r17 ::= SEQUENCE {
    sl-MeasReuseMeasConfigForSLRSRP-r17      ENUMERATED {true} OPTIONAL, //if this
field is configured, then UE reuse SL-MeasConfig-r16 for SD-RSRP (measurement of sidelink
signal strength for sidelink discovery message transmitted by relay), if this field is not
configured, then UE use the remaining fields in SL-MeasConfig-17 for SD-RSRP (measurement
of sidelink signal strength for sidelink discovery message transmitted by relay)
    sl-MeasObjectToRemoveList-r17 SL-MeasObjectToRemoveList-r17 OPTIONAL, -- Need N
    sl-MeasObjectToAddModList-r17 SL-MeasObjectList-r17    OPTIONAL, -- Need N
sl-MeasIdToRemoveList-r17 SL-MeasIdToRemoveList-r17 OPTIONAL, -- Need N
    sl-MeasIdToAddModList-r17 SL-MeasIdList-r17 OPTIONAL, -- Need N
    sl-QuantityConfig-r17 SL-QuantityConfig-r17 OPTIONAL, -- Need M
    ...
}
SL-MeasObjectToRemoveList-r17 ::= SEQUENCE (SIZE (1..maxNrofSL-ObjectId-r17)) OF
SL-MeasObjectId-r17
SL-MeasIdToRemoveList-r17 ::= SEQUENCE (SIZE (1..maxNrofSL-MeasId-r17)) OF SL-
MeasId-r17
SL-MeasConfig-r16 ::= SEQUENCE {
    sl-MeasObjectToRemoveList-r16 SL-MeasObjectToRemoveList-r16 OPTIONAL, -- Need N
    sl-MeasObjectToAddModList-r16 SL-MeasObjectList-r16 OPTIONAL, -- Need N
    sl-ReportConfigToRemoveList-r16 SL-ReportConfigToRemoveList-r16     OPTIONAL, --
Need N
    sl-ReportConfigToAddModList-r16 SL-ReportConfigList-r16 OPTIONAL, -- Need N
    sl-MeasIdToRemoveList-r16 SL-MeasIdToRemoveList-r16 OPTIONAL, -- Need N
    sl-MeasIdToAddModList-r16 SL-MeasIdList-r16 OPTIONAL, -- Need N
    sl-QuantityConfig-r16 SL-QuantityConfig-r16 OPTIONAL, -- Need M
    ...
}
SL-MeasObjectToRemoveList-r16 ::= SEQUENCE (SIZE (1..maxNrofSL-ObjectId-r16)) OF
SL-MeasObjectId-r16
SL-ReportConfigToRemoveList-r16 ::= SEQUENCE (SIZE (1..maxNrofSL-ReportConfigId-
r16)) OF SL-ReportConfigId-r16
SL-MeasIdToRemoveList-r16 ::= SEQUENCE (SIZE (1..maxNrofSL-MeasId-r16)) OF SL-
MeasId-r16
```

Among the information set for the UE to measure and report the sidelink signal strength for a sidelink unicast connection with the sidelink relay UE, the threshold configuration in Table 4 below may be used, when the UE determines that the sidelink signal strength cannot be measured for the sidelink unicast connection with the sidelink relay UE, for a threshold configuration among the information configured for the UE to measure and report the sidelink signal strength for a sidelink discovery message transmitted by the sidelink relay UE. The base station or sidelink relay UE may configure threshold configuration information shown in Table 4 below so that the UE can measure and report the sidelink signal strength for a sidelink discovery message when the UE cannot measure the sidelink signal strength for a sidelink unicast connection.

TABLE 4

SL-MeasTriggerQuantity-r16 ::=   CHOICE {
  sl-RSRP-r16      RSRP-Range,
  ...
}
RSRP-Range ::=      INTEGER(0..127)

The base station or sidelink relay UE may configure a separate threshold configuration for sidelink discovery message measurement and reporting as shown in Table 5 below so that the UE can measure and report the sidelink signal strength for a sidelink discovery message when the UE cannot measure the sidelink signal strength for a sidelink unicast connection.

TABLE 5

SL-MeasTriggerQuantity-r16 ::=   CHOICE {
    sl-RSRP-r16      RSRP-Range, // threshold configuration applied to signaling transmitted
and received on sidelink unicast connection
    sl-RSRP-r17      RSRP-Range, // threshold configuration applied to sidelink discovery
message
  ...
}
RSRP-Range ::=      INTEGER(0..127)

The base station may configure a quantity parameter for sidelink measurement as shown in Table 6 and provide the parameter to the UE. The base station may configure the quantity parameter to be used for at least one or a combination of a case where the UE performs sidelink measurement for a unicast connection with the sidelink relay, or a case where the UE determines that sidelink measurement cannot be performed for signaling transmitted and received through the unicast connection with the sidelink relay UE and performs sidelink measurement on a sidelink discovery message transmitted by the sidelink relay UE. The sidelink quantity parameter for signaling transmitted and received through a sidelink unicast connection and the sidelink quantity parameter for a sidelink discovery message may be set as separate parameters or the same parameter.

TABLE 6

The IE SL-QuantityConfig specifies the layer 3 filtering coefficients for NR SL RSRP measurement for a destination.
SL-QuantityConfig-r16 ::=    SEQUENCE {
   sl-FilterCoefficientDMRS-r16    FilterCoefficient DEFAULT fc4,
   ...
}

TABLE 6-continued

DMRS based L3 filter configuration:
Specifies L3 filter configuration for sidelink RSRP measurement result from the L1 filter(s), as defined in TS 38.215.

When the UE is configured with the sidelink quantity parameter in Table 6, the parameter can be used for at least one or a combination of a case where the UE performs sidelink measurement for signaling transmitted and received through a unicast connection with the sidelink relay UE, or a case where the UE performs sidelink measurement on a sidelink discovery message transmitted by the sidelink relay UE. When the UE determines that sidelink measurement cannot be performed for signaling transmitted and received through a unicast connection with the sidelink relay UE and performs sidelink measurement for a sidelink discovery message transmitted by the sidelink relay UE, if there is a sidelink quantity parameter set for sidelink discovery message measurement, the UE can use this parameter.

When the UE determines that sidelink measurement cannot be performed for signaling transmitted and received through a unicast connection with the sidelink relay UE and performs sidelink measurement for a sidelink discovery message transmitted by the sidelink relay, if there is no sidelink quantity parameter set for sidelink discovery message measurement, the UE may apply the sidelink quantity parameter set for measurement on signaling transmitted and received through a unicast connection with the sidelink relay UE to sidelink discovery message measurement.

When the UE is in an RRC_CONNECTED state in which an RRC connection with the base station is established, the UE may report information on sidelink data transmission and reception to the base station, and the base station may support configurations and resource allocation necessary for the UE to transmit and receive sidelink data based on the information on sidelink data transmission and reception reported by the UE.

Instances of information on sidelink data transmission and reception reported by the UE to the base station may include at least one or a combination of items shown in Table 7 below. The information in Table 7 may be included in a sidelink UE information NR message transmitted from the UE to the base station.

TABLE 7

UE is interested or no longer interested to receive or transmit NR sidelink communication, (information about interest in transmitting or receiving sidelink data)
UE is requesting assignment or release of transmission resource for NR sidelink communication, (allocation request or release request for transmission resources to transmit sidelink data)
UE is reporting QoS parameters and QoS profile(s) related to NR sidelink communication, (information on QoS parameters and QoS profiles for sidelink data to be transmitted or received)

TABLE 7-continued

UE is reporting that a sidelink radio link failure or sidelink RRC
reconfiguration failure has been detected, (notification of RLF
occurring in sidelink unicast connection, notification
of failure in sidelink unicast connection setup)
UE is reporting the sidelink UE capability information of the
associated peer UE for unicast communication, (sidelink UE
capability information about peer UE in sidelink unicast connection)
UE is reporting the RLC mode information of the sidelink data
radio bearer(s) received from the associated peer UE for unicast
communication. (RLC mode information set for peer
UE in sidelink unicast connection)

In at least one or a combination of a case where the UE serves as a sidelink relay and transmits a sidelink discovery message, a case where the UE serves as a sidelink remote UE and receives or transmits a sidelink discovery message, or a case where a unicast connection between a UE and a sidelink relay UE is established and the remote UE performs data transmission and reception to and from the base station through the unicast connection with the sidelink relay UE (referred to as SL relay communication in the disclosure), the remote UE or relay UE may report information on sidelink discovery message transmission and reception or information on SL relay communication to the base station, and the remote UE or relay UE may receive, from the base station, support such as configuration information and resource allocation necessary for transmitting and receiving a sidelink discovery message and/or performing SL relay communication. The base station may be able to determine whether the remote UE or relay UE needs support for a sidelink discovery message or for SL relay communication.

Therefore, the remote UE or relay UE may be able to compose information to be included in a sidelink UE information NR message and transmit the sidelink UE information NR message to the base station so that the base station can distinguish whether assistance information for a sidelink discovery message or assistance information for SL relay communication is reported.

Next, to report sidelink assistance information for a sidelink discovery message or sidelink assistance information for SL relay communication to the base station, a description will be given of operations of the remote UE or relay UE to compose a sidelink UE information NR message including the sidelink assistance information and transmit the sidelink UE information NR message to the base station with reference to FIGS. 8 to 10.

Figure 8:
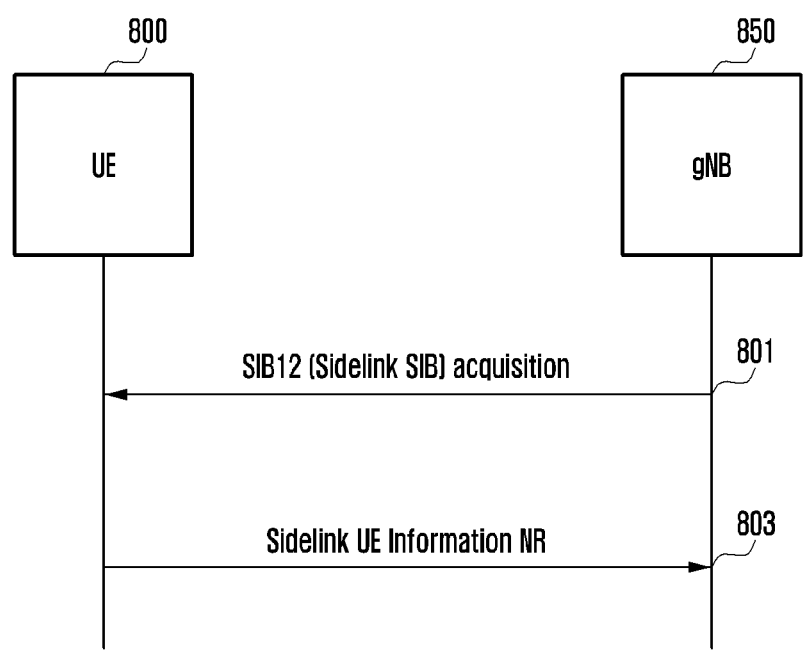
FIG. 8 illustrates signal flows for the UE to report sidelink assistance information to the base station according to an embodiment of the present disclosure.

FIG. 8 illustrates signal flows for the UE to report sidelink assistance information to the base station according to an embodiment of the present disclosure.

With reference to FIG. 8, at step 801, the UE 800 (remote UE or relay UE) may receive a message including a sidelink configuration, for example, a system information block (SIB) message (e.g., SIB12), transmitted by the base station 850. Based on the sidelink SIB information obtained at step 801, the UE 800 may determine that the base station 850 supports at least one or a combination of sidelink data transmission and reception (sidelink communication), sidelink discovery, sidelink relay discovery, or sidelink relay communication.

At step 803, the UE 800 may transmit a sidelink UE information NR message including sidelink assistance information of the UE 800 to the base station 850 according to the sidelink functionality supported by the base station.

For example, upon determining that the base station 850 supports sidelink communication, the UE 800 may transmit a sidelink UE information NR message including the sidelink assistance information shown in Table 7 above to the base station 850.

For instance, when it is determined that the base station 850 supports sidelink discovery and sidelink relay discovery and the base station 850 has not configured or allocated resources for transmitting a sidelink discovery message and a sidelink relay discovery message, the UE 800 may transmit a sidelink UE information NR message including sidelink assistance information shown in Table 8 below to the base station 850. The UE 800 may compose a sidelink UE information NR message including assistance information for transmitting or receiving a sidelink discovery message or a sidelink relay discovery message and transmit the information to the base station 850. The UE 800 may not include information regarding sidelink QoS profile, sidelink RLC mode, radio link failure (RLF) in sidelink unicast connection, failure in sidelink unicast connection establishment, and sidelink (SL) capability of peer UE, as sidelink assistance information for the sidelink discovery message or the sidelink relay discovery message.

Since the sidelink radio bearer configuration for a sidelink discovery message and sidelink relay discovery message is set as a fixed configuration, it may be not necessary for the UE 800 to report assistance information regarding sidelink QoS profile, sidelink RLC mode, and sidelink unicast connection establishment failure to the base station 850. Since the sidelink capability of the peer UE receiving a sidelink discovery message and sidelink relay discovery message is information known to the base station 850, it may be not necessary for the UE 800 to report assistance information about the sidelink capability of the peer UE to the base station 850. Since there is no need to establish a sidelink unicast connection for a sidelink discovery message and a sidelink relay discovery message, it may be not necessary for the UE 800 to report assistance information about an RLF in sidelink unicast connection to the base station 850.

TABLE 8

The purpose of this procedure is to inform the network that the Relay
UE or Remote UE:
UE is interested or no longer interested to receive or transmit NR
sidelink discovery, (information about UE's interest in
transmitting or receiving sidelink discovery message or
sidelink relay discovery message)
UE is requesting assignment or release of transmission resource for
NR sidelink discovery, (allocation request or release request of UE
for transmission resources for sidelink
discovery message and sidelink relay discovery message)

An example of an operation in which the UE 800 composes and transmits a sidelink UE information NR message including assistance information for a sidelink discovery message and sidelink relay discovery message shown in Table 8 may be shown as Table 9 below.

TABLE 9

The UE shall set the contents of the SidelinkUEInformationNR message as follows:
1> if the UE initiates the procedure to indicate it is (no more) interested to receive NR
sidelink discovery or to request (configuration/release) of NR sidelink discovery transmission
resources (i.e., UE includes all concerned information, irrespective of what triggered the
procedure):

TABLE 9-continued

2> if SIB12 including sl-ConfigCommonNR_SLDiscovery is provided by the PCell:
3> if configured by upper layers to receive NR sidelink discovery:
4> include sl-RxInterestedFreqList and set it to the frequency for NR sidelink discovery reception;
3> if configured by upper layers to transmit NR sidelink discovery:
4> include sl-TxResourceReqList and set its fields (if needed) as follows for each destination for which it requests network to assign NR sidelink discovery resource:
5> set sl-DestinationIdentity to the destination identity configured by upper layer for NR sidelink discovery transmission;
5> set sl-CastType to the cast type of the associated destination identity configured by the upper layer for the NR sidelink discovery transmission;
5> set sl-InterestedFreqList to indicate the frequency of the associated destination for NR sidelink discovery transmission;
5> set sl-TypeTxSyncList to the current synchronization reference type used on the associated sl-InterestedFreqList for NR sidelink discovery transmission.
2> submit the SidelinkUEInformationNR message to lower layers for transmission.

For example, when it is determined that the base station 850 supports sidelink relay communication and the base station 850 has not configured or allocated resources for sidelink relay communication, the UE 800 may transmit a sidelink UE information NR message including sidelink assistance information shown in Table 10 below to the base station 850. The UE 800 that processes assistance information shown in Table 10 for performing sidelink relay communication may include a remote UE or relay UE supporting layer 2 UE-to-NW sidelink relay communication. The UE 800 may compose a sidelink UE information NR message including assistance information about SL relay communication, that is, transmission or reception of signaling transmitted and received through a sidelink unicast connection between a remote UE and a relay UE, and transmit the information to the base station 850. The UE 800 may not include information regarding sidelink QoS profile, sidelink RLC mode, failure in sidelink unicast connection establishment, and SL capability of peer UE, as sidelink assistance information for SL relay communication.

As to a sidelink QoS profile for SL relay communication, since the base station can configure a sidelink radio bearer applied to SL relay communication based on a sidelink QoS profile already known to the base station, it may be not necessary for the UE 800 to report assistance information corresponding to the sidelink QoS profile and the sidelink RLC mode to the base station 850. Since the base station 850 can configure a sidelink radio bearer applied to SL relay communication to the remote UE and the relay UE, the base station may configure a sidelink radio bearer so as to prevent a sidelink unicast connection establishment failure from occurring. Hence, it may be not necessary for the UE 800 to report assistance information about a sidelink unicast connection establishment failure to the base station 850. Since the base station 850 can be aware of the sidelink capability of the remote UE and the relay UE for SL relay communication, it may be not necessary for the UE 800 to report assistance information about the sidelink capability of the peer UE to the base station 850.

TABLE 10

The purpose of this procedure is to inform the network that the L2 U2N Relay UE or L2 U2N Remote UE:
UE is interested or no longer interested to receive or transmit NR sidelink communication for relay service, (information about UE's interest in transmission or reception for SL relay communication)

TABLE 10-continued

UE is requesting assignment or release of transmission resource for NR sidelink communication for relay service, (allocation request or release request of UE for transmission resources needed for transmitting signaling in SL relay communication)

An example of an operation in which the UE 800 composes and transmits a sidelink UE information NR message including assistance information about SL relay communication shown in Table 10 above may be shown as Table 11 below.

TABLE 11

The L2 U2N Relay UE or L2 U2N Remote UE shall set the contents of the SidelinkUEInformationNR message as follows:
1> if the UE initiates the procedure to indicate it is (no more) interested to receive NR sidelink communication for relay service or to request (configuration/release) of NR sidelink communication transmission resources for relay service (i.e., UE includes all concerned information, irrespective of what triggered the procedure):
2> if SIB12 including sl-ConfigCommonNR is provided by the PCell:
3> if configured by upper layers to receive NR sidelink communication for relay service:
4> include sl-RxInterestedFreqList and set it to the frequency for NR sidelink communication reception for relay service;
3> if configured by upper layers to transmit NR sidelink communication for relay service:
4> include sl-TxResourceReqList and set its fields (if needed) as follows for each destination for which it requests network to assign NR sidelink communication resource for relay service:
5> set sl-DestinationIdentity to the destination identity configured by upper layer for NR sidelink communication for relay service;
5> set sl-CastType to the cast type of the associated destination identity configured by the upper layer for the NR sidelink communication for relay service; (in Release 17, sl-CastType is set to unicast)
5> set sl-InterestedFreqList to indicate the frequency of the associated destination for NR sidelink communication transmission for relay service;
5> set sl-TypeTxSyncList to the current synchronization reference type used on the associated sl-InterestedFreqList for NR sidelink communication transmission.
2> submit the SidelinkUEInformationNR message to lower layers for transmission.

In the case of general sidelink data transmission and reception as shown in Table 7, when a sidelink RLF occurs in a sidelink unicast connection, the RRC_CONNECTED UE having established an RRC connection to the base station may report the sidelink RLF having occurred in the sidelink unicast connection to the base station. When a sidelink RLF occurs in a sidelink unicast connection between a remote UE and a relay UE corresponding to SL relay communication, the relay UE may report assistance information about the sidelink RLF having occurred in the sidelink unicast connection for SL relay communication to the base station. The remote UE does not need to report assistance information about the sidelink RLF having occurred in the sidelink unicast connection for SL relay communication to the base station. Due to a sidelink RLF having occurred in a sidelink unicast connection with a sidelink relay UE, when the remote UE reconnects to the base station through another sidelink relay UE or directly connects to the base station, the remote UE may transmit an RRC reestablishment message to the base station.

For example, when the UE 800 is a sidelink relay UE, the sidelink assistance information for SL relay communication transmitted by the relay UE may include not only the information shown in Table 10 and Table 11 but also the information shown in Table 12 corresponding to assistance information about a sidelink RLF occurring in the sidelink unicast connection with the remote UE. The UE 800 may transmit a sidelink UE information NR message including the information shown in Table 12 to the base station 850. The UE 800 reporting assistance information for sidelink relay communication shown in Table 12 may include a relay UE supporting layer 2 UE-to-NW sidelink relay communication.

TABLE 12

The purpose of this procedure is to inform the network that the L2 U2N Relay UE:
UE is reporting that a sidelink radio link failure has been detected on the unicast connection for relay service.

An example of an operation in which the UE 800 composes and transmits a sidelink UE information NR message including assistance information about SL relay communication shown in Table 12 above may be shown as Table 13 below.

TABLE 13

The L2 U2N Relay UE shall set the contents of the SidelinkUEInformationNR message as follows:
1> if the UE initiates the procedure to indicate it is (no more) interested to receive NR sidelink communication for relay service or to request (configuration/ release) of NR sidelink communication transmission resources for relay service (i.e., UE includes all concerned information, irrespective of what triggered the procedure):
2> if SIB12 including sl-ConfigCommonNR is provided by the PCell:
3> if configured by upper layers to transmit NR sidelink communication for relay service:
4> if a sidelink radio link failure has been declared;
5> include sl-FailureList and set its fields as follows for each destination for which it reports the failure of TABLE 13-continued NR sidelink communication for relay service:
6> set sl-DestinationIdentity to the destination identity configured by upper layer for NR sidelink communication transmission for relay service;
6> set sl-Failure as rlf for the associated destination for the NR sidelink communication transmission for relay service;
2> submit the SidelinkUEInformationNR message to lower layers for transmission.

In case that the UE 800 is interested in sidelink discovery, sidelink relay discovery, and SL relay communication, the base station 850 is determined as supporting sidelink discovery, sidelink relay discovery, and SL relay communication based on the sidelink SIB obtained from the base station 850 at step 801, and the base station 850 is determined as not having configured and allocated transmission resources for sidelink discovery, sidelink relay discovery, and SL relay communication to the UE 800, the UE 800 may compose sidelink assistance information including all the information shown in Table 8 and Table 10 for the sidelink UE information NR message transmitted at step 803 to the base station 850.

For example, the format of a sidelink UE information NR message may include information shown in Table 14 below.

TABLE 14

SidelinkUEInformationNR-IEs ::= SEQUENCE {
   SUI_Discovery {...} optional, -- Cond SL discovery
   SUI_RelayCommunication {...} optional -- Cond SL relay communication
}
{...} contains at least RX interested frequency list, TX resource request list, SL failure report.

In Table 14, information elements (IEs) that can be included as SUI_Discovery assistance information or SUI_RelayCommunication assistance information may include at least one or a combination of RX interested frequency list, TX resource request list, or SL failure report. The SUI_Discovery assistance information reported by the remote UE or relay UE may include at least one or a combination of an RX interested frequency list or a TX resource request list. The SUI_RelayCommunication assistance information reported by the remote UE may include at least one or a combination of an RX interested frequency list or a TX resource request list. The SUI_RelayCommunication assistance information reported by the relay UE may include at least one or a combination of RX interested frequency list, TX resource request list, or SL failure report. An example of a sidelink UE information NR message including at least one or a combination of RX interested frequency list, TX resource request list, or SL failure report, reported by the remote UE or relay UE, may be shown as Table 15.

TABLE 15

SidelinkUEInformationNR-IEs ::= SEQUENCE {
  sl-RxInterestedFreqList-SLdiscovery SL-InterestedFreqList OPTIONAL, -- Cond SL discovery
  sl-TxResourceReqList-SLdiscovery SL-TxResourceReqList OPTIONAL, -- Cond SL discovery
  sl-RxInterestedFreqList-relaycomm SL-InterestedFreqList OPTIONAL, -- Cond SL relay communication
  sl-TxResourceReqList-relaycomm SL-TxResourceReqList OPTIONAL, -- Cond SL relay communication
  ...
}

TABLE 15-continued

```
SL-InterestedFreqList ::= SEQUENCE (SIZE (1..maxNrofFreqSL)) OF INTEGER
(1..maxNrofFreqSL)
SL-TxResourceReqList ::= SEQUENCE (SIZE (1..maxNrofSL-Dest)) OF SL-TxResourceReq
SL-TxResourceReq ::= SEQUENCE {
  sl-DestinationIdentity SL-DestinationIdentity,
  sl-CastType ENUMERATED {broadcast, groupcast, unicast, spare1},
sl-TxInterestedFreqList SL-TxInterestedFreqList OPTIONAL,
  sl-TypeTxSyncList SEQUENCE (SIZE (1..maxNrofFreqSL)) OF SL-TypeTxSync
OPTIONAL,
...
}
SL-TxInterestedFreqList ::= SEQUENCE (SIZE (1..maxNrofFreqSL)) OF INTEGER
(1..maxNrofFreqSL)
SL-FailureList ::= SEQUENCE (SIZE (1..maxNrofSL-Dest-r16)) OF SL-Failure-r16
SL-Failure ::= SEQUENCE {
  sl-DestinationIdentity SL-DestinationIdentity, (or reports local remote UE ID used to indicate
remote UE in SL relay communication)
  sl-Failure ENUMERATED {rlf, spare 7, spare6, spare5, spare4, spare3, spare2, spare1} //
indicates SL RLF assistance information. may be denoted by a one-bit indicator indicating SL
RLF assistance information as another form of SL-Failure.
}
```

As another example, the format of a sidelink UE information NR message may include information shown in Table 16 below.

TABLE 16

```
SidelinkUEInformationNR-IEs ::= SEQUENCE {
  SUI_Purpose CHOICE {
    SUI_Discovery {SUI contents for discovery},
    SUI_RelayCommunication {SUI contents for SL relay communication}
  }
{SUI contents for discovery} contains at least one or combination of RX interested frequency
list, TX resource request list.
{SUI contents for SL relay communication} contains at least one or combination of RX
interested frequency list, TX resource request list, SL failure report.
```

In Table 16 above, information elements (IEs) that can be included as SUI_Discovery assistance information or SUI_RelayCommunication assistance information may include at least one or a combination of RX interested frequency list, TX resource request list, or SL failure report. The SUI_Discovery assistance information reported by the remote UE or relay UE may include at least one or a combination of an RX interested frequency list or a TX resource request list. The SUI_RelayCommunication assistance information reported by the remote UE may include at least one or a combination of an RX interested frequency list or a TX resource request list. The SUI_RelayCommunication assistance information reported by the relay UE may include at least one or a combination of RX interested frequency list, TX resource request list, or SL failure report. An example of a sidelink UE information NR message including at least one or a combination of RX interested frequency list, TX resource request list, or SL failure report, reported by the remote UE or relay UE, may be shown as Table 17.

TABLE 17

```
SidelinkUEInformationNR-IEs ::= SEQUENCE {
  SUI_purpose CHOICE {
    SUI_DISCOVERY SEQUENCE {
      sl-RxInterestedFreqList SL-InterestedFreqList OPTIONAL,
      sl-TxResourceReqList SL-TxResourceReqList OPTIONAL,
    },
    SUI_RELAYCOMMUNICATION SEQUENCE {
      sl-RxInterestedFreqList SL-InterestedFreqList OPTIONAL,
      sl-TxResourceReqList SL-TxResourceReqList OPTIONAL,
      sl-FailureList SL-FailureList OPTIONAL
    }
  },
  ...
}
SL-InterestedFreqList ::= SEQUENCE (SIZE (1 .. maxNrofFreqSL)) OF INTEGER
(1..maxNrofFreqSL)
SL-TxResourceReqList ::= SEQUENCE (SIZE (1..maxNrofSL-Dest)) OF SL-TxResourceReq
SL-TxResourceReq ::= SEQUENCE {
  sl-DestinationIdentity SL-DestinationIdentity,
  sl-CastType ENUMERATED {broadcast, groupcast, unicast, spare1},
```

TABLE 17-continued

```
sl-TxInterestedFreqList SL-TxInterestedFreqList OPTIONAL,
    sl-TypeTxSyncList SEQUENCE (SIZE (1..maxNrofFreqSL)) OF SL-TypeTxSync
OPTIONAL,
    ...
}
SL-TxInterestedFreqList ::= SEQUENCE (SIZE (1..maxNrofFreqSL) OF INTEGER
(1..maxNrofFreqSL)
SL-FailureList ::= SEQUENCE (SIZE (1..maxNrofSL-Dest-r16)) OF SL-Failure-r16
SL-Failure ::= SEQUENCE {
    sl-DestinationIdentity SL-DestinationIdentity, (or reports local remote UE ID used to indicate
remote UE in SL relay communication)
    sl-Failure ENUMERATED {rlf, spare 7, spare6, spare5, spare4, spare3, spare2, spare1 } //
indicates SL RLF assistance information. may be denoted by a one-bit indicator indicating SL
RLF assistance information as another form of SL-Failure.
}
```

The case where the UE 800 transmits a sidelink UE information NR message at step 803 may include a case where, when the UE 800 has no RRC connection to the base station 850, that is, is not in an RRC_CONNECTED state, and the base station 850 is determined as not having configured and allocated transmission resources for sidelink discovery, sidelink relay discovery, and SL relay communication to the UE 800, the UE 800 makes a transition to the RRC_CONNECTED state to request the base station 850 to configure and allocate transmission resources for sidelink discovery, sidelink relay discovery, and SL relay communication.

Figure 9:
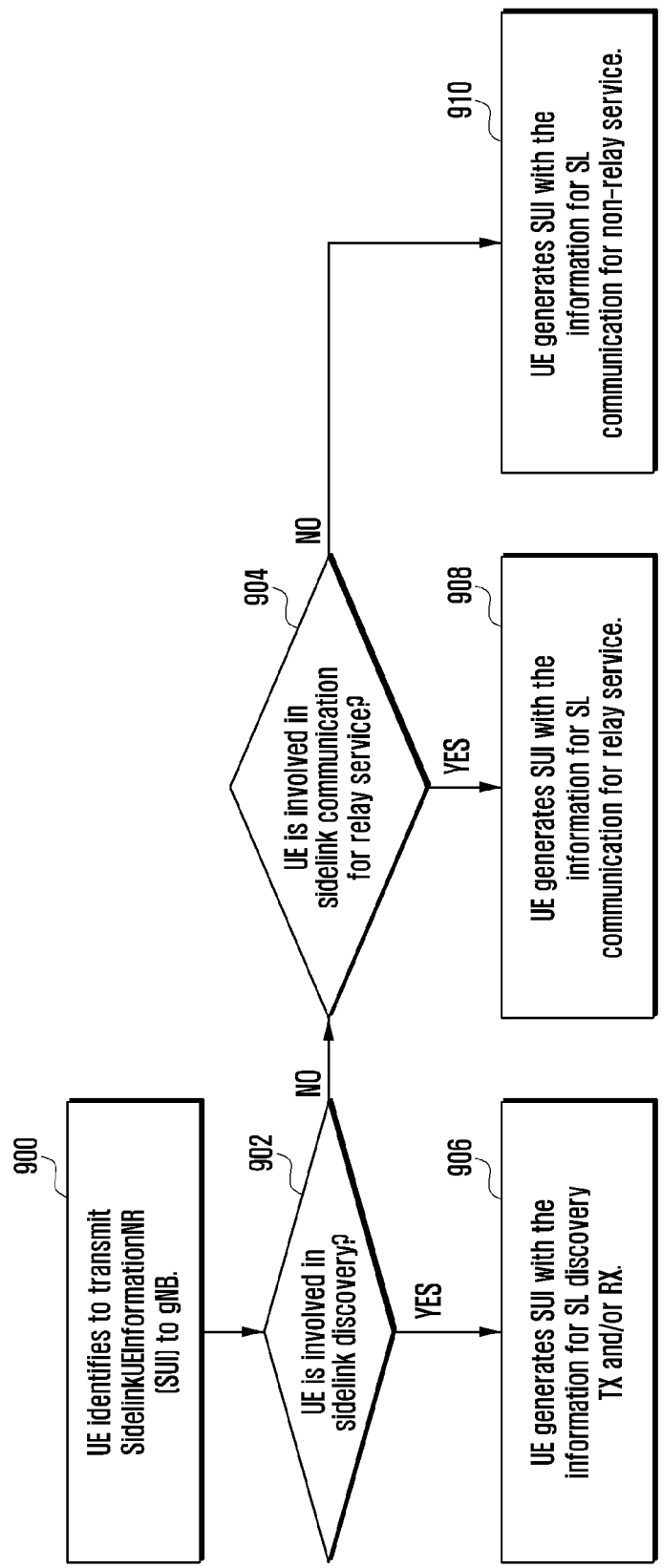
FIG. 9 illustrates operations of the UE to configure and report sidelink assistance information for the UE according to an embodiment of the present disclosure.

FIG. 9 illustrates operations of the UE to configure and report sidelink assistance information for the UE according to an embodiment of the present disclosure.

With reference to FIG. 9, at step 900, the UE may determine whether it is necessary to transmit a sidelink UE information NR message to the base station. For example, in case that the base station is determined as supporting sidelink discovery, sidelink relay discovery, SL relay communication, or general SL communication, when it is determined that the UE needs to be allocated resources from the base station to transmit signaling for a sidelink discovery message, a sidelink relay discovery message, SL relay communication, or general SL communication, the UE may transmit a sidelink UE information NR message to the base station. As another example, in case that the base station is determined as supporting sidelink discovery, sidelink relay discovery, or SL relay communication, when it is determined that the UE needs to report assistance information for a sidelink discovery message, sidelink relay discovery message, or SL relay communication (Table 8 to Table 17) to the base station, the UE may transmit a sidelink UE information NR message to the base station.

At step 902, the UE may determine whether it is necessary to report assistance information for sidelink discovery or sidelink relay discovery.

If it is necessary to report assistance information for sidelink discovery or sidelink relay discovery according to the determination at step 902, at step 906, the UE may compose a sidelink UE information NR message including assistance information for sidelink discovery or sidelink relay discovery (e.g., RX interested frequency list, TX resource request for sidelink discovery or sidelink relay discovery), and transmit the composed sidelink UE information NR message to the base station.

Otherwise, if it is determined at step 902 that there is no need to report assistance information for sidelink discovery or sidelink relay discovery, at step 904, the UE may determine whether it is necessary to report assistance information for SL relay communication.

If it is necessary to report assistance information for SL relay communication according to the determination at step 904, at step 908, the UE may compose a sidelink UE information NR message including assistance information for SL relay communication (e.g., RX interested frequency list, TX resource request, SL failure report for SL relay communication), and transmit the composed sidelink UE information NR message to the base station.

Otherwise, if it is determined at step 904 that there is no need to report assistance information for SL relay communication, the UE may determine whether it is necessary to report assistance information for general sidelink data transmission and reception. If it is determined that there is a need to report assistance information for general sidelink data transmission and reception, at step 910, the UE may compose a sidelink UE information NR message including assistance information for general SL communication (e.g., Table 7), and transmit the composed sidelink UE information NR message to the base station.

Figure 10:
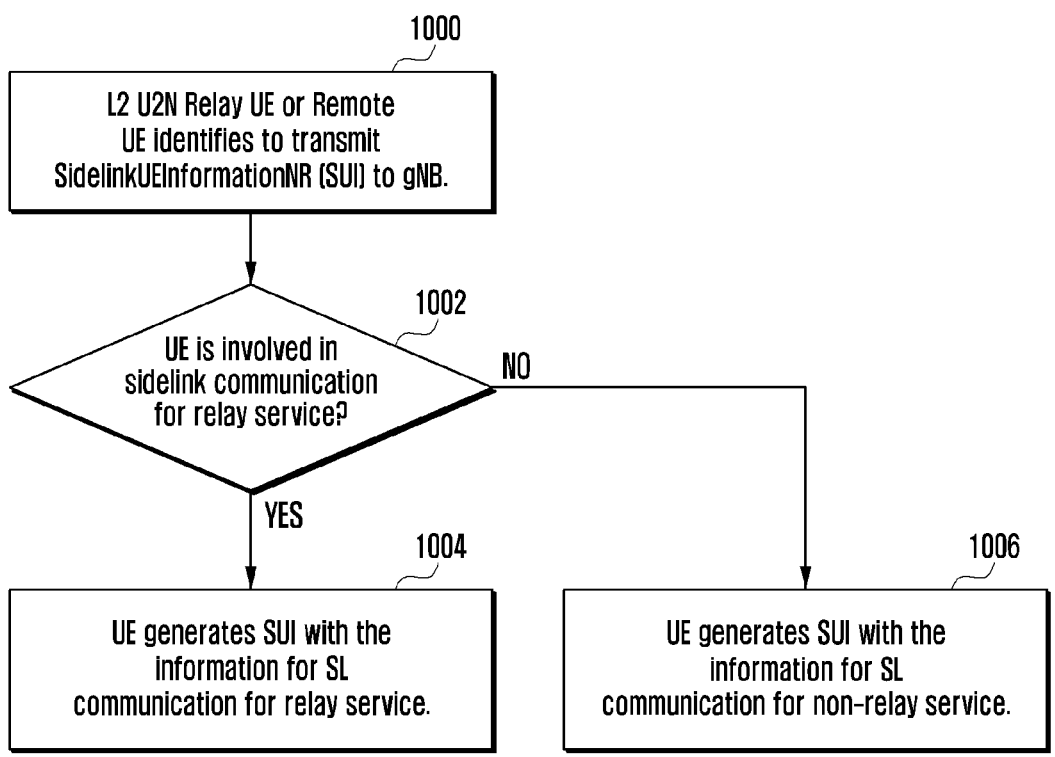
FIG. 10 illustrates operations of the UE to configure and report sidelink assistance information for the UE according to another embodiment of the present disclosure.

FIG. 10 illustrates operations of the UE to configure and report sidelink assistance information for the UE according to another embodiment of the present disclosure. FIG. 10 illustrates operations of a remote UE and a relay UE for layer 2 UE-to-NW relay.

With reference to FIG. 10, at step 1000, the UE (remote UE or relay UE) may determine whether it is necessary to transmit a sidelink UE information NR message to the base station. For example, in case that the base station is determined as supporting SL relay communication or general SL communication, when it is determined that the UE needs to be allocated resources from the base station to transmit signaling for SL relay communication or general SL communication, the UE may transmit a sidelink UE information NR message to the base station. As another example, in case that the base station is determined as supporting SL relay communication, when it is determined that the UE needs to report assistance information for SL relay communication (Table 10 to Table 17) to the base station, the UE may transmit a sidelink UE information NR message to the base station. As another example, in case that the base station is determined as supporting general SL communication, when it is determined that the UE needs to report assistance information for general SL communication (Table 7 above) to the base station, the UE may transmit a sidelink UE information NR message to the base station.

At step 1002, the UE may determine whether it is necessary to report assistance information for SL relay communication.

If it is necessary to report assistance information for SL relay communication according to the determination at step 1002, at step 1004, the UE may compose a sidelink UE information NR message including assistance information for SL relay communication (e.g., RX interested frequency list, TX resource request, SL failure report for SL relay communication), and transmit the composed sidelink UE information NR message to the base station.

Otherwise, if it is determined at step 1002 that there is no need to report assistance information for SL relay communication, the UE may determine whether it is necessary to report assistance information for general sidelink data transmission and reception. Upon determining that it is necessary to report assistance information for general sidelink data transmission and reception, at step 1006, the UE may compose a sidelink UE information NR message including assistance information for general SL communication (e.g., Table 7), and transmit the composed sidelink UE information NR message to the base station.

Next, with reference to FIG. 11, a description will be given of operations of the base station to receive, from a remote UE or relay UE, and process a sidelink UE information NR message including sidelink assistance information composed of at least one or a combination of assistance information for a sidelink discovery message/sidelink relay discovery message, assistance information for SL relay communication, or assistance information for general SL communication according to the embodiments of FIGS. 8 to 10.

Figure 11:
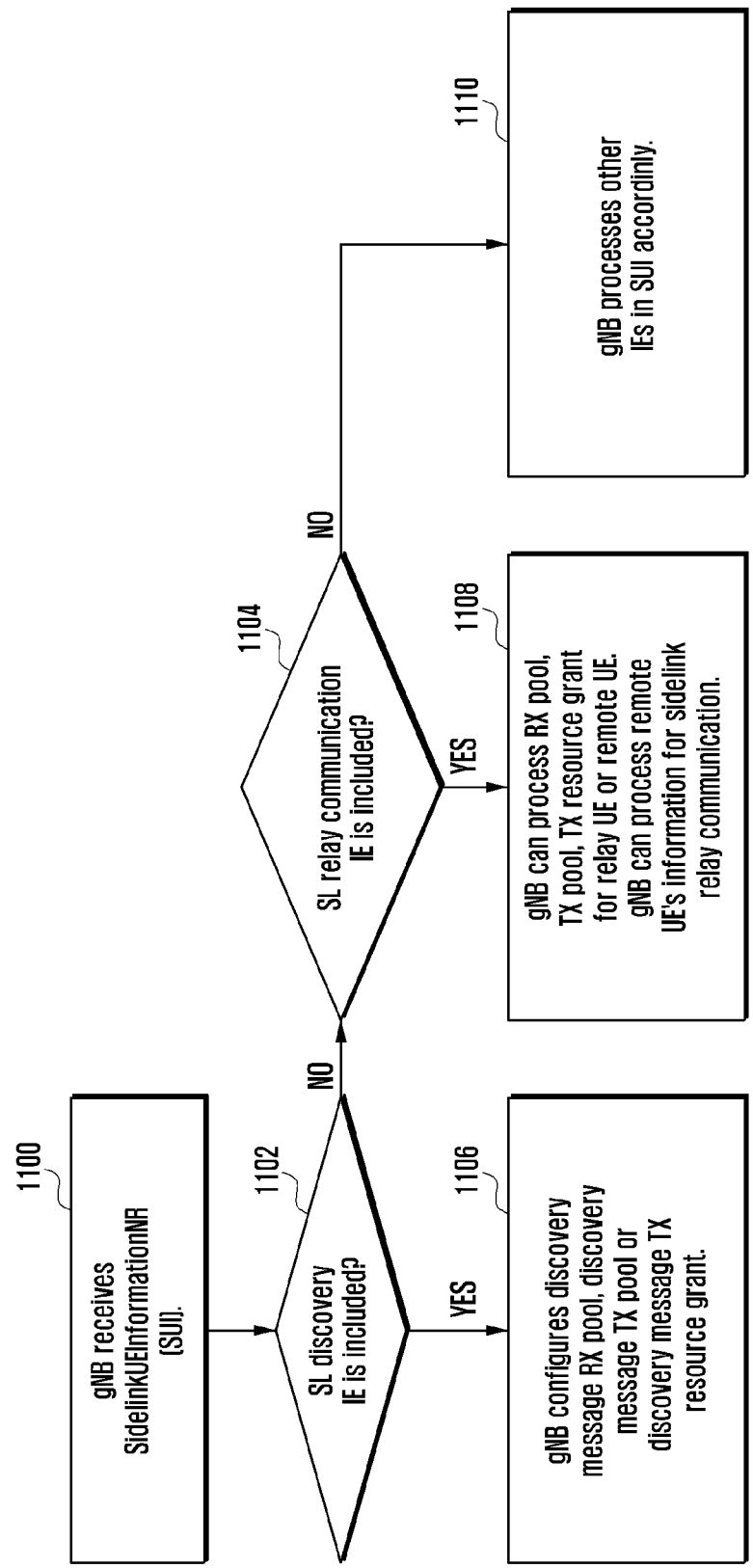
FIG. 11 illustrates operations of the base station to process sidelink assistance information of a UE according to an embodiment of the present disclosure.

FIG. 11 illustrates operations of the base station to process sidelink assistance information of a UE according to an embodiment of the present disclosure.

With reference to FIG. 11, at step 1100, the base station may receive a sidelink UE information NR message from the UE.

At step 1102, the base station may determine whether the sidelink UE information NR message includes assistance information for a sidelink discovery message or a sidelink relay discovery message.

Upon determining that the sidelink UE information NR message includes assistance information for a sidelink discovery message or a sidelink relay discovery message according to the determination at step 1102, at step 1106, the base station may process the assistance information for a sidelink discovery message or a sidelink relay discovery message.

The assistance information processed at step 1106 by the base station may include at least one or a combination of a RX frequency list or a TX resource request for a side link discovery message or a side link relay discovery message (Table 8 to Table 17). Based on the assistance information, the base station may configure and allocate at least one or a combination of reception resource pool, transmission resource pool, or transmission resource assignment for a sidelink discovery message or a sidelink relay discovery message to the UE having transmitted the sidelink UE information NR message.

Otherwise, when it is determined at step 1102 that the sidelink UE information NR message does not include assistance information for a sidelink discovery message or a sidelink relay discovery message, at step 1104, the base station may determine whether assistance information for SL relay communication is included in the sidelink UE information NR message.

Upon determining that assistance information for SL relay communication is included in the sidelink UE information NR message according to the determination at step 1104, at step 1108, the base station may process the assistance information for SL relay communication.

The assistance information processed at step 1108 by the base station may include at least one or a combination of RX frequency list, TX resource request, and SL failure report for SL relay communication (Table 8 to Table 17 above). Based on the assistance information, the base station may configure and allocate at least one or a combination of reception resource pool, transmission resource pool, or transmission resource assignment for SL relay communication to the UE having transmitted the sidelink UE information NR message. Upon receiving an SL failure report, the base station may stop transmitting downlink data to the remote UE via the sidelink relay, and may identify the transmission status of downlink data transmitted to the remote UE through the sidelink relay (e.g., latest PDCP SN number determined to have been successfully transmitted to the remote UE) and identify the reception status of uplink data received from the remote UE through the sidelink relay (e.g., latest PDCP SN number determined to have been successfully received from the remote UE).

When it is determined that the remote UE reconnects to the base station through a sidelink relay or when it is determined that the remote UE reconnects to the base station through a direct connection to the base station, the base station may resume downlink transmission and uplink reception to and from the remote UE based on the packet delivery status of the remote UE. To identify the downlink and uplink packet delivery status of the remote UE, the base station may obtain, from the serving relay UE (relay UE having reported the SL RLF having occurred in the sidelink unicast connection with the remote UE) of the remote UE, downlink packet delivery status information of the remote UE (how many downlink packets have been successfully transmitted from the relay UE to the remote UE) and uplink packet delivery status information of the remote UE (how many uplink packets have been successfully transmitted from the relay UE to the base station).

Otherwise, upon determining that assistance information for SL relay communication is not included in the sidelink UE information NR message at step 1104, the base station may determine whether assistance information for general SL communication is included in the sidelink UE information NR message. Upon determining that assistance information for general SL communication is included in the sidelink UE information NR message, at step 1110, the base station may process the assistance information for general SL communication. The assistance information processed at step 1110 by the base station may include the information shown in Table 7 above.

The methods according to the embodiments described in the claims or specification of the disclosure may be implemented in the form of hardware, software, or a combination thereof.

When implemented in software, a computer-readable storage medium storing one or more programs (software modules) may be provided. The one or more programs stored in the computer-readable storage medium may be configured to be executable by one or more processors of an electronic device. The one or more programs may include instructions that cause the electronic device to execute the methods according to the embodiments described in the claims or specification of the disclosure.

Such a program (software module, software) may be stored in a random access memory, a nonvolatile memory such as a flash memory, a read only memory (ROM), an electrically erasable programmable read only memory (EEPROM), a magnetic disc storage device, a compact disc ROM (CD-ROM), a digital versatile disc (DVD), other types of optical storage devices, or a magnetic cassette. Or such a program may be stored in a memory composed of a combination of some or all of them. In addition, a plurality of component memories may be included.

In addition, such a program may be stored in an attachable storage device that can be accessed through a communication network such as the Internet, an intranet, a local area network (LAN), a wide LAN (WLAN), or a storage area network (SAN), or through a communication network composed of a combination thereof. Such a storage device may access the device that carries out an embodiment of the disclosure through an external port. In addition, a separate storage device on a communication network may access the device that carries out an embodiment of the disclosure.

In the specific embodiments of the disclosure, the elements included in the disclosure are expressed in a singular or plural form according to the provided specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

On the other hand, although specific embodiments have been described in the detailed description of the disclosure, various modifications are possible without departing from the scope of the disclosure. Therefore, the scope of the disclosure should not be limited to the described embodiments but should be defined by both the claims described below and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) terminal in a wireless communication system, the method comprising:
   receiving, from a base station, system information including at least one of information indicating that the base station supports sidelink relay discovery or information indicating that the base station supports sidelink relay communication;
   identifying whether the UE is requesting a transmission resource for a sidelink discovery message, or requesting a transmission resource for a UE to network (U2N) relay communication; and
   transmitting, to the base station, a message including sidelink UE information,
   wherein, in case that the system information includes the information indicating that the base station supports the sidelink relay discovery and the UE is requesting the transmission resource for the sidelink discovery message, the sidelink UE information includes information associated with a transmission of the sidelink discovery message, and
   wherein, in case that the system information includes the information indicating that the base station supports the sidelink relay communication and the UE is requesting the transmission resource for the U2N relay communication, the sidelink UE information includes information associated with the U2N relay communication.

2. The method of claim 1, wherein, in case that the system information includes the information indicating that the base station supports the sidelink relay discovery and the UE is configured to receive the sidelink discovery message, the information associated with the transmission of the sidelink discovery message includes information on at least one frequency for receiving the sidelink discovery message.

3. The method of claim 1, wherein, in case that the system information includes the information indicating that the base station supports the sidelink relay discovery and the UE is configured to transmit the sidelink discovery message, the information associated with the transmission of the sidelink discovery message includes information for requesting to the base station to assign at least one resource for transmitting the sidelink discovery message.

4. The method of claim 3, wherein the information for requesting to the base station includes at least one of information on at least one destination identity indicating at least one destination for transmitting the sidelink discovery message, information on at least one cast type of the at least one destination for transmitting the sidelink discovery message, information on at least one frequency of the at least one destination on which the UE is interested to transmit the sidelink discovery message, or information on at least one synchronization reference used on the at least one frequency for transmitting the sidelink discovery message.

5. The method of claim 1, wherein, in case that the system information includes the information indicating that the base station supports the sidelink relay communication and the UE is configured to transmit the U2N relay communication, the information associated with the U2N relay communication includes information for requesting to the base station to assign at least one resource for the U2N relay communication.

6. The method of claim 5, wherein the information for requesting to the base station includes at least one of information on at least one destination identity indicating at least one destination for the U2N relay communication, information on at least one frequency of the at least one destination on which the UE is interested for a transmission for the U2N relay communication, or information on at least one synchronization reference used on the at least one frequency for the U2N relay communication.

7. The method of claim 1, wherein the message includes a sidelink UE information new radio (sidelinkUEinformationNR) message.

8. The method of claim 1, wherein the system information includes a system information block 12 (SIB12).

9. A user equipment (UE) in a wireless communication system, the UE comprising:
   a transceiver; and
   a controller coupled with the transceiver and configured to:
      receive, from a base station, system information including at least one of information indicating that the base station supports sidelink relay discovery or information indicating that the base station supports sidelink relay communication,
      identify whether the UE is requesting a transmission resource for a sidelink discovery message, or requesting a transmission resource for a UE to network (U2N) relay communication, and
      transmit, to the base station, a message including sidelink UE information,
   wherein, in case that the system information includes the information indicating that the base station supports the sidelink relay discovery and the UE is requesting the transmission resource for the sidelink discovery message, the sidelink UE information includes information associated with a transmission of the sidelink discovery message, and wherein in case that the system information includes the information indicating that the base station supports the sidelink relay communication and the UE is requesting the transmission resource for the U2N relay communication, the sidelink UE information includes information associated with the U2N relay communication.

10. The UE of claim 9, wherein, in case that the system information includes the information indicating that the base station supports the sidelink relay discovery and the UE is configured to receive the sidelink discovery message, the information associated with the transmission of the sidelink discovery message includes information on at least one frequency for receiving the sidelink discovery message.

11. The UE of claim 9, wherein, in case that the system information includes the information indicating that the base station supports the sidelink relay discovery and the UE is configured to transmit the sidelink discovery message, the information associated with the transmission of the sidelink discovery message includes information for requesting to the base station to assign at least one resource for transmitting the sidelink discovery message.

12. The UE of claim 11, wherein the information for requesting to the base station includes at least one of information on at least one destination identity indicating at least one destination for transmitting the sidelink discovery message, information on at least one cast type of the at least one destination for transmitting the sidelink discovery message, information on at least one frequency of the at least one destination on which the UE is interested to transmit the sidelink discovery message, or information on at least one synchronization reference used on the at least one frequency for transmitting the sidelink discovery message.

13. The UE of claim 9, wherein, in case that the system information includes the information indicating that the base station supports the sidelink relay communication and the UE is configured to transmit the U2N relay communication, the information associated with the U2N relay communication includes information for requesting to the base station to assign at least one resource for the U2N relay communication.

14. The UE of claim 13, wherein the information for requesting to the base station includes at least one of information on at least one destination identity indicating at least one destination for the U2N relay communication, information on at least one frequency of the at least one destination on which the UE is interested for a transmission for the U2N relay communication, or information on at least one synchronization reference used on the at least one frequency for the U2N relay communication.

15. The UE of claim 9, wherein the message includes a sidelink UE information new radio (sidelinkUEinformationNR) message.

16. The UE of claim 9, wherein the system information includes a system information block 12 (SIB12).

* * * * *